United States Patent [19]
Coulling et al.

[11] Patent Number: 6,084,519
[45] Date of Patent: Jul. 4, 2000

[54] MULTI-FUNCTION LIGHT SENSOR FOR VEHICLE

[75] Inventors: Keith J. Coulling, West Buxton; Jonathan D. Pearson, Harrison, both of Me.; Dennis J. Hegyi, Ann Arbor, Mich.

[73] Assignee: Control Devices, Inc., Standish, Me.

[21] Appl. No.: 08/855,188

[22] Filed: May 13, 1997

Related U.S. Application Data

[63] Continuation-in-part of application No. 08/599,272, Feb. 8, 1996, Pat. No. 5,703,568, which is a continuation of application No. 08/059,597, May 7, 1993, abandoned.

[51] Int. Cl.[7] ................................................. G08B 21/00
[52] U.S. Cl. ..................... 340/602; 340/604; 250/574; 250/575; 15/250.001; 15/250.12; 15/DIG. 15; 318/DIG. 2
[58] Field of Search .................... 340/602, 604; 250/574, 575; 15/DIG. 15, 250.001, 250.12; 318/483, DIG. 2

[56] References Cited

U.S. PATENT DOCUMENTS

| | | | |
|---|---|---|---|
| 4,131,834 | 12/1978 | Blaszkowski | 318/483 |
| 4,355,271 | 10/1982 | Noack | 318/480 |
| 4,463,294 | 7/1984 | Gibson | 318/313 |
| 4,476,419 | 10/1984 | Fukatsu et al. | 318/444 |
| 4,481,450 | 11/1984 | Watanbe et al. | 318/444 |
| 4,485,452 | 11/1984 | Cording et al. | 364/565 |
| 4,527,105 | 7/1985 | Shiraishi | 318/444 |
| 4,595,866 | 6/1986 | Fukatsu et al. | 318/444 |
| 4,620,141 | 10/1986 | McCumber et al. | 318/483 |
| 4,676,638 | 6/1987 | Yasuda | 356/237 |
| 4,798,956 | 1/1989 | Hochstein | 250/341 |
| 4,859,867 | 8/1989 | Larson et al. | 207/10.1 |
| 4,867,561 | 9/1989 | Fujii et al. | 356/237 |
| 4,871,917 | 10/1989 | O'Farrell et al. | 250/341 |
| 4,916,373 | 4/1990 | Al-Attar et al. | 318/443 |
| 4,931,167 | 6/1990 | Wilwerding | 280/262.5 |
| 4,956,592 | 9/1990 | Schierbeek et al. | 318/483 |
| 4,973,844 | 11/1990 | O'Farrell et al. | 250/341 |
| 4,987,354 | 1/1991 | Steinmann | 318/444 |
| 4,991,590 | 2/1991 | Shi | 128/667 |
| 5,059,877 | 10/1991 | Teder | 318/444 |
| 5,105,129 | 4/1992 | Shimizu et al. | 318/266 |
| 5,119,002 | 6/1992 | Kato et al. | 318/444 |
| 5,140,233 | 8/1992 | Wallrafen | 318/264 |
| 5,140,234 | 8/1992 | Wallrafen | 318/264 |
| 5,313,072 | 5/1994 | Vachss | 250/573 |
| 5,367,379 | 11/1994 | Makino | 356/446 |
| 5,386,111 | 1/1995 | Zimmerman | 250/227.25 |
| 5,406,082 | 4/1995 | Pearson et al. | 250/339.01 |
| 5,436,541 | 5/1995 | Mangler et al. | 318/483 |
| 5,483,346 | 1/1996 | Butzer | 356/369 |
| 5,508,521 | 4/1996 | Kraft et al. | 250/574 |
| 5,572,315 | 11/1996 | Krell | 356/136 |
| 5,703,568 | 12/1997 | Hegyi | 340/602 |

FOREIGN PATENT DOCUMENTS

| | | |
|---|---|---|
| 41 39 515 A1 | 6/1992 | Germany . |
| 41 23 641 A1 | 1/1993 | Germany . |
| 62-43543 | 2/1987 | Japan . |

*Primary Examiner*—Julie Lieu
*Attorney, Agent, or Firm*—Woodard, Emhardt, Naughton, Moriarty & McNett

[57] ABSTRACT

An apparatus and method for controlling the operation of the windshield wipers of a vehicle in response to the deposition of water on the exterior of the windshield; the operation of the air conditioning system in response to the formation of water condensation on the interior of the windshield of the vehicle; and the operation of the ventilation system in response to the presence of smoke in the cabin of the vehicle.

22 Claims, 18 Drawing Sheets

6,084,519

MULTI-FUNCTION LIGHT SENSOR FOR VEHICLE

CROSS-REFERENCE TO RELATED APPLICATIONS

The present application is a continuation-in-part of U.S. patent application Ser. No. 08/599,272 filed Feb. 8, 1996 now U.S. Pat. No. 5,703,568 which is a continuation of U.S. patent application Ser. No. 08/059,597, filed May 7, 1993, now abandoned.

BACKGROUND OF THE INVENTION

This invention relates generally to systems and arrangements for determining the presence of a plurality of environmental conditions in relation to a vehicle, and more particularly, to a system which can control the operation of a device, such as the windows, the convertible roof, the air conditioner, a dehumidifier, the ventilation system, or the windshield wipers of a vehicle, in response to the presence of droplets of liquid on a transparent surface thereof, such as the windshield of the vehicle, the presence of condensation on the interior of the windshield of the vehicle, or the presence of smoke in the vehicle.

DESCRIPTION OF THE PRIOR ART

Numerous efforts have been made in the prior art to provide a system which reliably will control the windshield wipers of a vehicle in response to the presence of water on the windshield. In addition to failing to meet the level of reliability required to avoid the annoying and distracting false triggering of windshield wipers, the majority of the known arrangements must be installed directly onto the windshield, resulting in unsightly wiring extending from a sensor which has been bonded to the interior of the windshield. With respect to the false triggering of the windshield wipers, many of the known arrangements will trigger a false indication of rain in response to fluctuations in the ambient light, as would be the case with a vehicle traveling under the shadows of telephone poles, or under highway lamps.

Existing optical rain sensors of the type which are usually installed within vehicles are mounted on the windshield in the wiper path. Optical sensors generally include a light source, such as an LED, and a photodetector, usually a phototransistor or a photodiode, arranged such that when no raindrops are on the windshield, light from the LED is totally internally reflected at the outside surface of the windshield to a photodiode. If a drop of rain is deposited on the windshield where the light beam is reflected, the conditions for total internal reflection are violated, and the intensity of light in the reflected beam is reduced. In these known systems, a relatively large array of LEDs and photodiodes are required to monitor a few square inches on the windshield. The extent of the monitored region of the windshield must be sufficiently large to provide an accurate sample of the random distribution of raindrops which fall on the surface of the windshield. As stated, the array of LEDs and photodiodes must be mounted inside the vehicle on the windshield in the wiper path.

Another problem associated with known arrangements is that of cost. In most of the presently available designs, one photodetector is required for each LED in the array. There is, therefore, a need for a rain sensor which is economical and which need not be installed on the windshield of the vehicle.

In addition to water depositing on the outer surface of the windshield, water will collect on the interior of the windshield in the form of condensed water vapor. Such condensed water vapor can, within a matter of minutes, reduce the visibility through the window to a dangerous level. In such situations, it is essential that the defogger function be carried out by cycling the air conditioner to dehumidify the air. The operation of the air conditioner generally will decrease the amount of fog on the interior of the windshield in a relatively short period of time.

It is additionally useful in a vehicle to reduce the accumulation of smoke in the cabin of the vehicle which would result from the smoking of tobacco by the occupants. On occasion, the operator of the vehicle would be reluctant to embarrass a smoking passenger by obvious manipulation of the ventilator controls. Accordingly, it would be desirable for the ventilator to be operated automatically in response to the presence of smoke in the cabin.

It is, therefore, an object of this invention to provide an arrangement which is simple and will reliably detect the presence of water droplets on the outside of a windshield of a vehicle.

It is another object of this invention to provide an arrangement which is simple and will reliably detect the presence of condensed water vapor on the inside of a windshield of a vehicle.

It is also an object of this invention to provide an arrangement which is simple and will reliably detect the presence of smoke in the cabin of a vehicle.

It is a further object of this invention to provide a system for automatically operating the windshield wipers of a vehicle in response to the presence of water on the windshield.

It is additionally an object of this invention to provide a system for automatically operating an air conditioning or dehumidification system of a vehicle in response to the presence of condensed water vapor on the windshield.

It is yet a further object of this invention to provide a system for automatically operating the cabin ventilation system of a vehicle in response to the presence of smoke, such as cigarette smoke, in the cabin of the vehicle.

It is also another object of this invention to provide a system which responds to the effect on light by several environmental conditions, while maintaining immunity to variations in the ambient light levels.

It is yet an additionally object of this invention to provide a system which responds to the effect on light by several environmental conditions, in the vicinity of the windshield of the vehicle, without the need for establishing a direct contact between the system and the windshield.

It is still another object of this invention to provide a windshield wiper control sensor which need not be installed directly on the windshield of the vehicle.

It is a yet further object of this invention to provide a windshield wiper control sensor which can be installed on the dashboard of the vehicle.

SUMMARY OF THE INVENTION

The foregoing and other objects are achieved by this invention which provides an apparatus and method for controlling the operation of the windshield wipers of a vehicle in response to the deposition of water on the exterior of the windshield; the operation of the air conditioning system in response to the formation of water condensation on the interior of the windshield of the vehicle; and the operation of the ventilation system in response to the presence of smoke in the cabin of the vehicle.

In accordance with a first aspect of the invention, an arrangement is provided for detecting the presence of water droplets on the windshield of a vehicle. A light source produces a radiant energy and directs same toward the windshield. A first reflected portion of the radiant energy is reflected by the windshield, and a second portion of the radiant energy is scattered by the water droplets on the windshield. A light sensor having an input for receiving an ambient light and a received portion of the second reflected portion of the radiant energy from the light source is additionally provided. The reflected portion of the radiant energy has an amplitude which is responsive to the number of water droplets on the windshield. The light sensor further has a sensor output for producing a sensor output electrical signal which is responsive to the light received at the input. There is additionally provided a circuit which is coupled to the sensor output for providing a first electrical signal responsive to the received portion of the second reflected portion of the radiant energy from the light source. The sensor output also produces a second electrical signal which is substantially responsive to the ambient light.

In a specific illustrative embodiment of the invention, the second reflected portion of the radiant energy corresponds substantially to the proportion of the windshield which is covered by the water droplets.

In a highly advantageous embodiment of the invention, the circuit is provided with a driver which is coupled to the light source means. The driver produces a cyclical enabling signal having sequential first and second states for causing the light source to produce the radiant energy only during intervals of time that the cyclical enabling signal is in the first state. The circuit may be provided with an amplifier coupled to the sensor output for producing an amplified signal corresponding to the electrical signal responsive to the light which is received at the input of the light sensor.

A phase-responsive device is coupled to the amplifier and to the driver for producing a time-varying signal which is responsive to a difference between the magnitude of the sensor output electrical signal when the cyclical enabling signal is in the first state, and the magnitude of the sensor output electrical signal when the cycling enabling signal is in the second state. In one embodiment, first and second amplifier stages are provided, each having a predeterminable gain characteristic. The first and second amplifier stages are AC-coupled to one another.

In a still further embodiment of the invention, there is provided an integrator coupled to the phase-responsive device for integrating the time-varying signal over time to produce a rain signal. The integrator has an integration time constant characteristic which is longer than a cycle of the cyclically enabling signal. There is additionally provided a processor having a plurality of inputs for receiving the rain signal and the second electrical signal which is substantially responsive to the ambient light. A control signal is produced at the output of the processor. The responsiveness of the overall device to the quantum of water droplets on the windshield is adjustable with a sensitivity control which is coupled to the processor. The control signal is used to operate the windshield wiper.

In certain embodiments of the invention, a windshield wiper timer is employed to produce a signal which is responsive to the duration of a wipe cycle of the windshield wiper. This is useful to determine whether the windshield is wet or dry, since a wipe cycle generally will take longer on a dry windshield.

The control signal at the output of the processor is not limited to operation of the windshield wipers. In some embodiments of the invention, the control signal may be applied to operate a window, such as a power window, which would be closed in the vent rain is detected. In other embodiments, the control signal may be employed to operate a convertible top, which would be closed in response to the detection of rain.

In a preferred embodiment of the invention, the cyclical enabling signal has a frequency within a range of approximately between 5 kHz and 100 kHz. The integration time constant has a value of approximately between 0.5 ms and 250 ms. In addition, a structure, which may be in the form of a light baffle with one or more apertures therethrough for controlling or otherwise defining the field of view of the light sensor, may be employed, particularly with respect to the light sensor.

In accordance with a further aspect of the invention, an arrangement is provided for producing a controlled signal in response to the presence of liquid droplets on a first surface of a translucent material. In accordance with this further aspect of the invention, a light source produces a radiant energy and directs same toward at least a portion of a second surface of the translucent material. A first portion of the radiant energy is reflected by the translucent material, and a second portion of the radiant energy is scattered by the water droplets on the translucent material. A light sensor having an input for receiving an ambient light and a received portion of the second portion of the radiant energy from the light source, is provided. The second portion of the radiant energy has an amplitude which is responsive to the number of water droplets on the first surface of the translucent material. The light sensor is further provided with a sensor output for producing a sensor output electrical signal which is responsive to the light received at the input. A cyclical driver is coupled to the light source for causing same to produce the radiant energy during a portion of a cycle, at a predetermined cycle frequency. In addition, control signal circuitry which is coupled to the light sensor and to the cyclical driver produces a control signal in response to a differential between the magnitude of the sensor output electrical signal when the light source is illuminated, and the magnitude of the sensor output electrical signal when the light source is dark, during a cycle of the cyclical driver.

In a specific embodiment of this aspect of the invention, there is provided circuitry for producing an ambient light signal which is substantially responsive to an ambient light impinging on the input of the light sensor. A controller produces a controller signal which is responsive to the ambient light signal and the control signal produced by the control signal circuitry. Additionally, there is provided a sensitivity adjustment which is coupled to the controller for adjusting the sensitivity of the arrangement with respect to the number of water droplets on the first surface of the translucent material.

In accordance with a first method aspect of the invention, a process is applied to produce a signal which is responsive to the droplets of liquids on a first surface of a translucent material. The method is provided with the steps of:

illuminating a second surface of the translucent material with a cyclically varying light which is an illuminated state for a first portion of a cycle and dark for a second portion of said cycle;

receiving at a light sensor an ambient light and a portion of the cyclically varying light which is scattered by the droplets of the liquid on the first surface of the translucent material, and producing at an electrical output of the light sensor a sensor signal corresponding to the light received by the light sensor; and producing a difference signal responsive to the difference in the magnitude of the sensor signal between the first and second portions of said cycle.

In accordance with a further method aspect of the invention, the inventive method produces a plurality of signals, each responsive to a predetermined environmental condition of a vehicle of the type having a windshield, the method comprising the steps of:

energizing a source of illumination whereby electromagnetic energy is directed toward an interior surface of the windshield, the electromagnetic energy being in the form of a cyclically varying light which is in an illuminated state for a first portion of a cycle and dark for a second portion of said cycle;

receiving at a light sensor an ambient light and a portion of the cyclically varying light which has been scattered in response to the environmental condition; and producing at an electrical output of the light sensor a sensor signal corresponding to the light received by the light sensor.

In one embodiment of this further method aspect of the invention, the environmental condition is in the form of water droplets which are deposited on the exterior of the windshield. In another embodiment of the invention, the environmental condition is water vapor condensing on the interior of the windshield. In this embodiment, the cyclically varying light is scattered by the condensed water vapor. In a still further embodiment of the invention, the environmental condition is the presence of smoke particles in the vehicle, in the path between the source of illumination and the light sensor. In such an embodiment, the cyclically varying light is scattered by the smoke particle.

It is important to recognize that ay one or all of the aforementioned environmental conditions which are detected, can be detected by the same structure. The identification of the particular environmental condition which is present with respect to the vehicle is determinable by software. For example, when a car is operated in a defogger mode where the defogger function is carried out by cycling the air conditioner to dehumidify the air, it is observed that when the relative humidity inside the car is such that moisture condenses out on the windshield, the amount of fog on the windshield increases until the air conditioner cycles on after which the fog level rapidly decreases. One feature which is characteristic of the process is that the time for moisture to buildup is always longer than the time for the moisture to evaporate from the windshield. The time for moisture to buildup is rarely less than about 20 seconds, and could last several minutes, while the evaporation can occur over a time from a few seconds to perhaps over a minute.

Smoking has a characteristic signature, which is distinct, but not quite as distinct as for moisture condensing on the windshield. Smoking has a time scale of significant variations within a few seconds. Also, the time for smoke to build up is always smaller than the time for it to dissipate.

With respect to a signal for condensing moisture and fog, as detected by a rain detector structure, as will be described herein, it is noted that moisture condensing out on the windshield scatters light back from the light source, which may be in the form of LEDs, which is superimposed on the rain signal and detected by the photodiode after passing through a lock-in amplifier. Also, smoke which passes between the LED and the windshield will increase the amount of backscattered radiation detected by the photodiode after passing through the lock-in amplifier, and will be superimposed on the rain signal. In such an embodiment which his subjected to all three types of environmental conditions, software can be applied to separate out the three different signals, i.e rain, fog, and smoke, without the confusion of triggering on the windshield wipers in the presence of only fog and smoke.

In a further aspect of the present invention, an apparatus for detecting the presence of water droplets on a windshield of a vehicle is disclosed, comprising a first sensor channel, comprising a first light source for illuminating a first portion of the windshield with first light rays; and a first light sensor for detecting and producing a first output proportional to, at least a portion of the first light rays scattered by the water droplets on the windshield, wherein first light rays directly reflected by the windshield do not impinge upon the first light sensor; a second sensor channel, comprising a second light source for illuminating a second portion of the windshield with second light rays; and a second light sensor for detecting, and producing a second output proportional to, at least a portion of the second light rays directly reflected by the windshield and at least a portion of the second light rays scattered by the water droplets on the windshield; and a processor having inputs coupled to the first and second outputs, the processor producing a control signal indicative of whether the amount of water droplets on the windshield exceeds a predetermined threshold.

In another form of the invention a method for detecting the presence of water droplets on a windshield of a vehicle is disclosed, comprising the steps of: a) illuminating a first portion of the windshield with first light rays; b) sensing at least a portion of the first light rays scattered by the water droplets on the windshield; c) illuminating a second portion of the windshield with second light rays; d) sensing at least a portion of the second light rays directly reflected by the windshield and at least a portion of the second light rays scattered by the water droplets on the windshield; and e) producing a control signal indicative of whether the amount of water droplets on the windshield exceeds a predetermined threshold based upon the sensed light of steps (b) and (d).

In another form of the invention an apparatus for detecting the presence of water droplets on the windshield of a vehicle is disclosed, comprising a first sensor channel operative to detect rain on an exterior of the windshield and produce a first output; a second sensor channel operative to detect condensed water vapor fog on an interior of the windshield and produce a second output; and a processor having inputs coupled to the first and second outputs, the processor operable to use the second output to correct the first output such that contributions to the first output caused by fog are substantially removed, wherein the processor is further operable to produce a control signal using the corrected first output, wherein the control signal is indicative of whether the amount of rain on the exterior of the windshield exceeds a predetermined threshold.

In another form of the invention an apparatus for detecting the presence of water droplets on the windshield of a vehicle is disclosed, comprising at least one sensor operative to produce an output signal proportional to the amount of water droplets on the windshield, wherein no portion of the at least one sensor contact the windshield.

BRIEF DESCRIPTION OF THE DRAWINGS

Comprehension of the invention is facilitated by reading the following detailed description, in conjunction with the annexed drawing, in which.

DESCRIPTION OF THE PREFERRED EMBODIMENT

Figure 1:
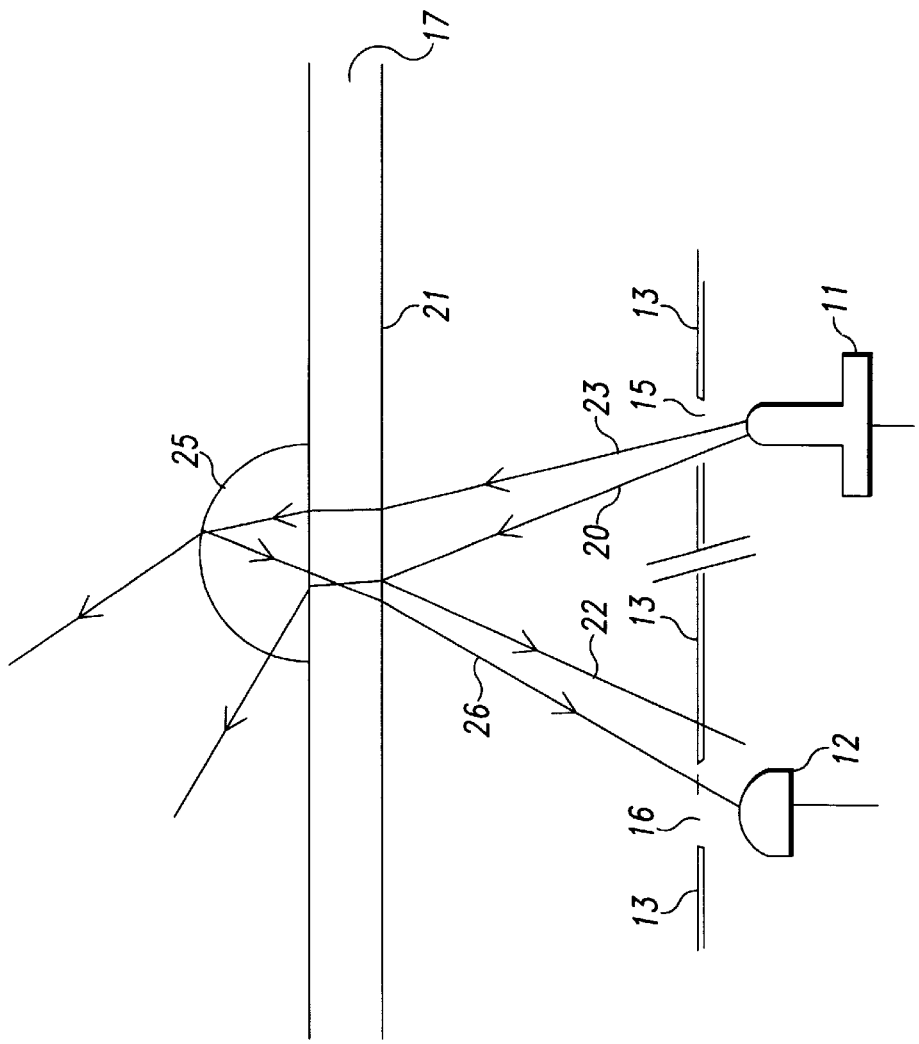
FIG. 1 is a schematic representation of certain elements of structure which are arranged in accordance with the principles of the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a schematic representation of certain elements of structure configured in accordance with the principles of the invention. More specifically, a light source, in the form of LED 11 and a photodiode 12 are arranged beneath a baffle 13 having an aperture 15 therethrough for LED 11 and an aperture 16 for photodiode 12. Baffle 13 may be the top surface of the dashboard (not shown) of a vehicle (not shown). As will be discussed hereinbelow, apertures 15 and 16 are configured to prevent light from being reflected directly to the photodiode by the windshield.

The operation of baffle 13 with apertures 15 and 16 therethrough is illustrated in FIG. 1. As shown, a light ray 20 is propagated from LED 11 and impinges upon inner surface 21 of windshield 17. The light ray is reflected back as a reflected ray 22, which is shown in the figure to impinge upon baffle 13. Some of the light from LED 11, such as light ray 23, impinges upon inner surface 21 of the windshield, where it is refracted into and through the windshield to a raindrop 25. The raindrop backscatters the light along a backscattered ray 26 which is propagated through apertures 16 and into photodiode 12. Thus, it can be seen that the light from LED 11 is directed to photodiode 12 only after being backscattered, such as by a raindrop. The intensity of light reflected at an interface is related to the ratio of the indices of refraction of the two media on opposite sides of the interface. The index of refraction of water is 1.33, and the index of refraction of air is 1.00. When a raindrop is present, instead of a reflection arising at the outer surface of the windshield, because without the raindrop the discontinuity in the index of refraction between the glass and air is relatively large, the light from the LED is transmitted into the raindrop and the reflection occurs at the discontinuity of the index of refraction at the curved air-water interface at the outer surface of the raindrop. This surface reflects light back into the vehicle over a large angular range, some of the rays striking the photodiode.

The photodiode signal is proportional to the fractional area of the windshield covered by raindrops which is relatively similar to the way human vision is interfered with by raindrops. The angular range over which light is reflected depends upon the cross-sectional width of the raindrop at the water-glass interface, i.e. the diameter of the part of the raindrop touching the glass, and, to the extent that its outer surface can be approximated as a sphere, by the radius of that sphere. If the width-to-radius ratio were the same for different size raindrops, they would all reflect light over the same angular range. Assuming spherical raindrops with the same width-to-radius ratio, the amount of light reflected into a given direction depends only on the cross-sectional contact area of the raindrop. Thus, the total amount of light reflected back into the photodetector is proportional to the area of the glass covered by raindrops. Also, the visual obscuration of the rain is approximately proportional to the area covered by the raindrops. From this, one can conclude that the intensity of light reflected by raindrops on a windshield back to the photodiode is a good measure of the obscuration caused by rain that a driver experiences and that the signal detected by this rain sensor is an appropriate one to gauge the visual perception of rain by a driver.

The rain detector system of the present invention must work under a variety of conditions. Occasionally, the sun is shining when it is raining, and the LED light reflected by raindrops must be detectable in sunlight. This is achieved by modulating LED 11 at a reference frequency and picking out the photodiode current at the same frequency in phase with the modulated LED light using a type of phase-sensitive amplifier, sometimes referred to as lock-in amplifier.

Referring once again to FIG. 1, light rays 20 and 23 are shown to exit LED 11. As previously described, light ray 20 is reflected from inner surface 21 of windshield 17 and is propogated through aperture 16 of the photodiode. Any ray which exits further to the left will strike aperture 15 of LED 11, and therefore, one is assured that no rays which are directly reflected by the windshield will reach photodiode 12. However, it is possible that a ray from LED 11 will be scattered twice and reach the photodiode. With reasonable care being paid to designing the apertures, relatively little of the light will reach the photodiode by scattering or by light reflecting from objects other than raindrops. Even if some light not scattered by raindrops reaches the photodiode, it does not significantly prevent the detection of raindrops. It does, however, decrease the dynamic range of the detector. The electronics, which will be described hereinbelow, will saturate with a smaller amount of rain on the windshield because some of the dynamic range is taken up by light scattered by the presence of condensed water vapor (not shown) on inner surface 21 of windshield 17, or the presence of smoke (not shown) in the cabin of the vehicle.

Figure 2:
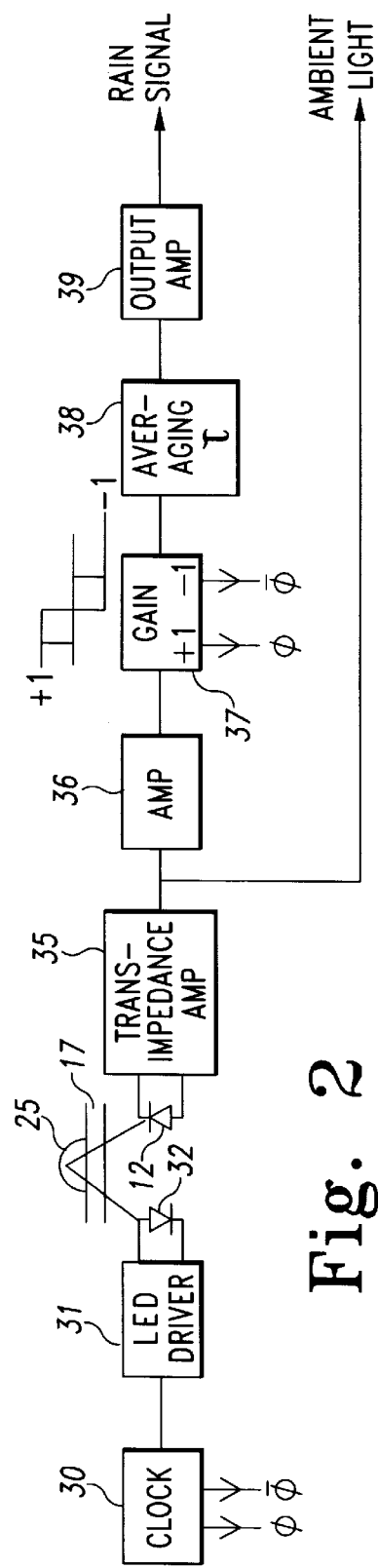
FIG. 2 is a function block representation of circuitry used in combination with the structure of FIG. 1 to produce signals corresponding to the presence of rain or fog on the windshield, or smoke, and the magnitude of the impinging ambient light.

FIG. 2 is a function block representation of an electronic system which is constructed in accordance with the principles of the invention. The electronics described with respect to this figure will detect the tiny fraction of the LED's light that reaches the photodiode in the large ambient light background, which can include full sunlight. Referring to FIG. 2, a clock 30 drives an LED driver 31 which is coupled to an LED array 32. LED array 32 bears analogous correspondence to LED 11 in FIG. 1. As shown in FIG. 2, the light from LED array 32 is propagated through windshield 17 and scattered in raindrop 25 so as to be reflected to photodiode 12.

Clock 30 and LED driver 31 function in combination to produce a square wave output (not shown) whereby the LED array is turned on for half of the clock period. The portion of the light propogated from LED array 32 which is received at photodiode 12 is converted into a current signal which is provided at an input of a transimpedence amplifier 35. The output of transimpedence amplifier 35 is a voltage which is proportional to the photodiode current. This voltage signal is then conducted to an amplifier 36. The output of amplifier 36 is conducted to a gain stage 37 which has a controllable gain of +1 or −1, and is used to separate the signal from the background. As shown, gain stage 37 has inputs for receiving phase references from clock 30. The gain is set to +1 when the LED is on, and to −1 when the LED is off. Since the ambient light is the same during the two halves of the clock period, the sum of the two halves is (rain signal+ambient light) when the gain is +1 and (−ambient) when the gain is −1. When these are added together, the result is the rain signal, i.e., (rain signal+ambient)+(−ambient)=rain signal.

An averaging stage 38 produces an average over time τ which is long compared to a clock period. The addition described hereinabove which separates the rain signal from the ambient background occurs in averaging stage 38. An output amplifier 39 provides additional gain and produces at its output the rain signal.

In order to change the sensitivity of the rain detector to correspond to night driving conditions for which the eye is more disturbed by rain on the windshield, an ambient light signal is derived from the output of transimpedence amplifier 35. During daytime operation, the ambient light generates a much larger current in the photodiode than the light backscattered by the raindrops so that the output of the transimpedence amplifier is approximately a measure of the ambient light signal. During low sky brightness conditions, the amplitude of the ambient light signal is reduced. That information is sent to a microprocessor, as will be described hereinbelow.

Figure 3:
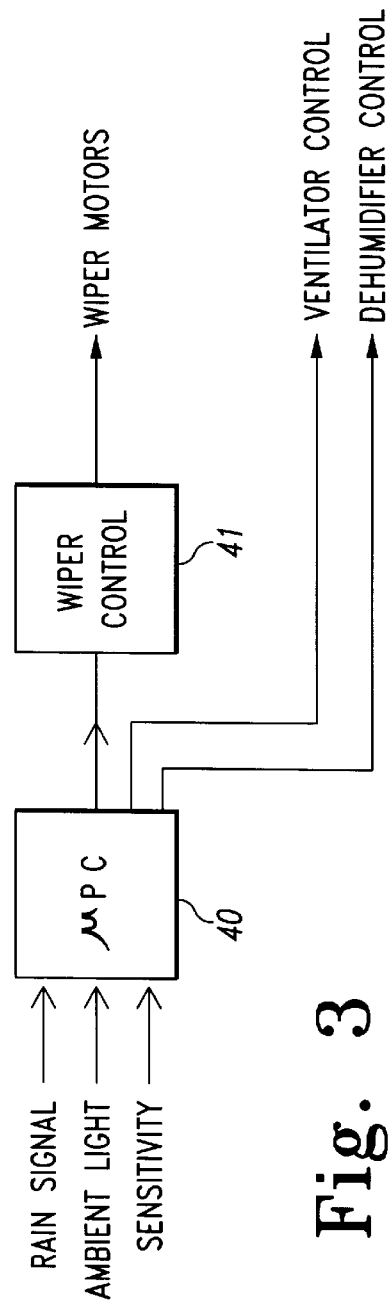
FIG. 3 is a function block representation of a microprocessor which receives the signals generated by the structure in FIG. 2 and controls a windshield wiper control unit.

FIG. 3 is a function block representation of a microprocessor 40 coupled at an output thereof to a wiper control 41. Microprocessor 40 is provided with an analog-to-digital convertor (not shown) which changes the threshold level rain signal necessary to generate a wipe to be reduced. In addition, microprocessor 40 provide control signals for the ventilator and dehumidifier controls.

Another situation for which the threshold level necessary to generate a wipe by the wipers should be reduced is when large drops of rain strike the windshield. For a given area of the windshield covered by small or large raindrops, large drops are visually much more distracting to a driver. A mathematical expression sensitive to the fractionally larger statistical fluctuations of large drops versus small drops can be written as:

$$Q = \frac{\sum_{i=1}^{n}(m_i - m_{ave})^2}{n(m_{ave})^2}$$

Here, $m_i$ is the change in the rain signal between the ith time element and the (i−1) time element that occur between two successive passages of the wiper blade past the rain sensor, and $m_{ave}$ is the average value of $m_i$ over the interval between two successive wipes. The quantity Q is the square of the standard deviation of $m_i$ normalized by $(m_{ave})^2$ in order to make a dimensionless ratio. For larger raindrops which are characterized by larger fluctuations, Q is larger than for small drops and may be used to reduce the threshold level of the rain signal necessary to generate a wipe. Also, FIG. 3 shows three inputs to the microprocessor: the rain signal, the ambient light signal, and a separate input set by the driver (not shown) to adjust the threshold amount of rain that generates an output to the wiper control which initiates a wipe.

There are times when it is difficult to tell when the windshield is wiped clean of all water. For example, if the water is a thin, very smooth sheet, it will scatter little radiation to the photodetector. Another way of getting an independent measure of the dryness of a windshield is by monitoring the time between successive wipes of a windshield wiper. As the windshield gets drier, there is more friction between the wiper and the glass, and the wiper motor slows down increasing the time between wipes. Monitoring the time between successive passages of the wiper blade in front of the rain sensor, the passage of the wiper appears as a very large amplitude signal which lasts for a small fraction of the time between wipes. This characteristic can be used by microprocessor 40 to determine whether the windshield is dry enough to shut down the wiper.

Figure 4:
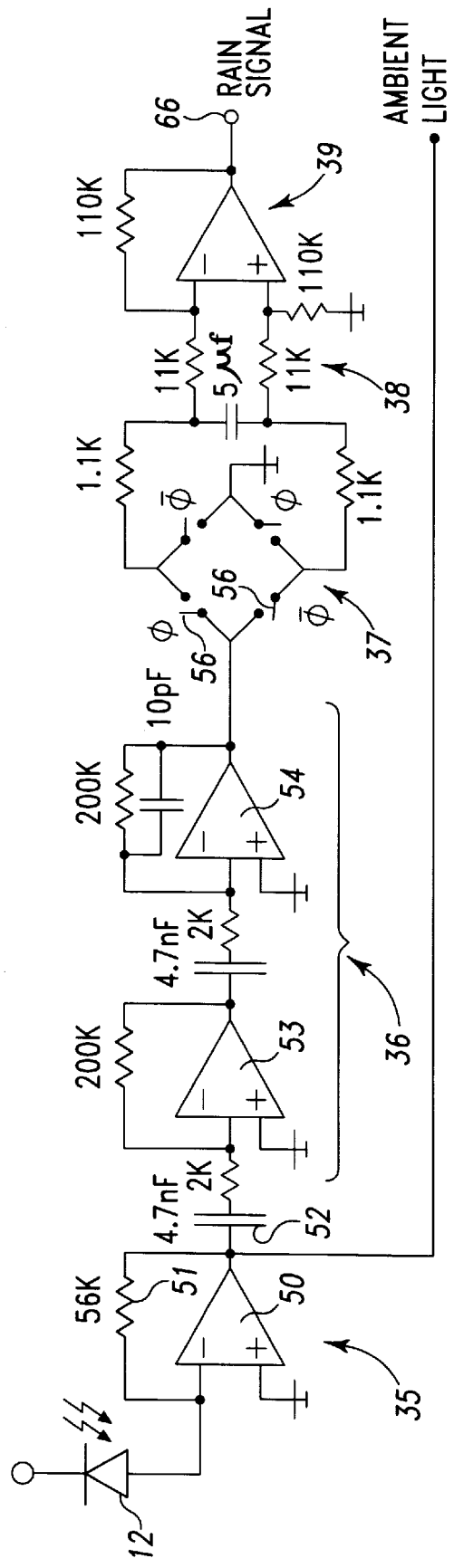
FIG. 4 is a schematic representation of a circuit which can be employed in the embodiment of FIG. 2.

FIG. 4 is a schematic representation of an electrical circuit for a phase-sensitive amplifier. As previously stated, photodiode 12 generates a current in transimpedence amplifier 35. In this specific illustrative embodiment, transimpedence amplifier 35 is formed of an amplifier 50 with a feedback resistor 51. Amplifier 50 produces at its output the ambient light signal. In this embodiment, feedback resistor 51 has a value of 56 kΩ. The transimpedence amplifier is AC-coupled via a capacitor 52 to amplifier 36 which is formed of an amplifier 53 which is AC-coupled to a father amplifier 54. Amplifier 53 has a gain of 100, as does amplifier 54.

Amplifier 36 is coupled at its output to gain stage 37 which is provided with a plurality of switches 56 which are set by the complementary outputs of clock 30, which will be described hereinbelow with respect to FIG. 5.

Figure 5:
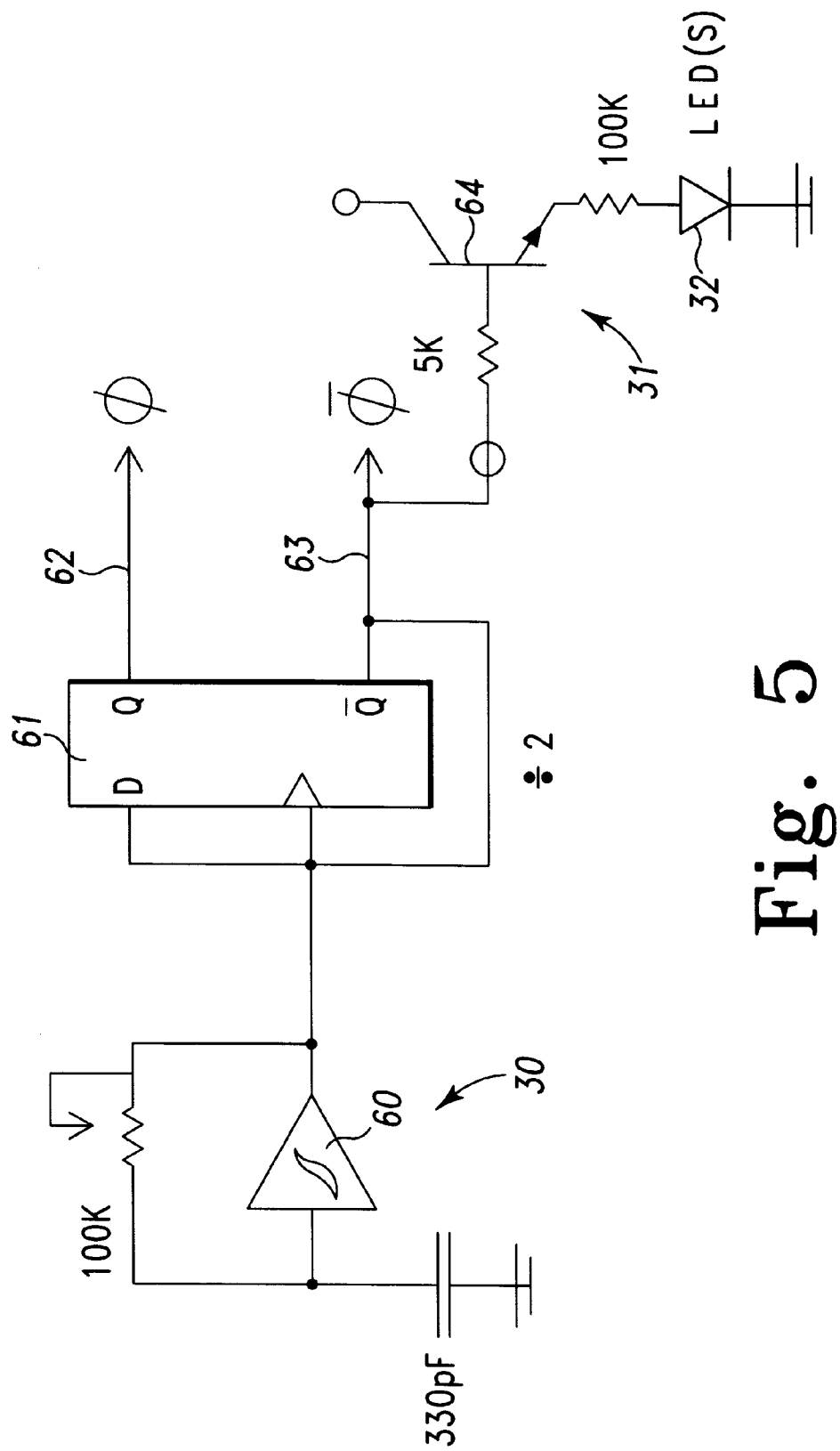
FIG. 5 is a schematic representation of circuitry which drives a light emitting diode in response to a clock.

Referring for the moment to FIG. 5, this figure is a schematic representation of clock 30 and LED driver 31. As shown, clock 30 is formed of an oscillator 60 which is coupled at its output to a type D flip-flop 61. Flip-flop 61 has complementary outputs 62 and 63, output 63 being coupled to LED driver 31, which is in the form of a transistor 64. Transistor 64 drives LED array 32, as described herein.

Referring once again to FIG. 4, switches 56 are opened and closed in response to outputs 62 and 63 of flip-flop 61 to provide the gain of +1 and −1, as described hereinabove with respect to FIG. 2. Gain stage 37 is coupled to averaging circuit 38 which is based on an RC design such that the averaging timer τ=RC. In this circuit, R consists of two 1.1 kΩ resistors in series so that R −2.2 kΩ, and C=5 μF, so that τ=11 ms. Output amplifier stage 39 provides a final gain of 10, and provides the rain signal, as well as the fog and smoke signals, at an output 66 thereof.

As previously described, the present invention is useful to determine the presence of condensed water vapor on the interior surface of the windshield, and smoke in the cabin of the vehicle. In embodiments of the invention where it is desired to determine the presence of condensation on the windshield or smoke, the present invention is operated to separate out the three signals, rain, fog and smoke, and not get confused by the windshield wipers going back and forth.

The logic behind the process is as follows: The lowest level signal coming out of the lock-in amplifier is stored as a "clean windshield signal". Thus, the passing back and forth of the windshield wipers does not confuse the data processing when there is a rapid increase in signal (one with a rise and fall time of about 100 ms), which is easily recognized and excluded from the data that is analyzed. The moisture signal rises linearly from the clean windshield level with a characteristic time of from 20 seconds to several minutes. It has an amplitude which is many times larger than the largest rain signal so that it will not be confused with the build up of rain on the windshield. Also, when there is condensing moisture on the glass, it is raining so there are a variety of conditions that must be satisfied for the microprocessor to have detected an interior fog condition. The confirming signature is that when fog is detected condensing on the windshield which causes the air conditioner to turn on, the signal (lock-in amplifier output signal) should decrease rapidly (the time scale is short compared to the time required for the fog to build up) to the clean window level. In terms of the output signal going to the air conditioner, it could be either a binary signal when a predetermined level of fog is detected, or it could be a calibrated signal which is proportional to the amount of fog on the windshield and would be used to turn the dehumidifier on and off.

The smoke detecting process is similar to that described above. After the wiper passage is removed from the signal (the output signal from the lock-in amplifier), a large rapid variation with a time scale of from 250 ms to 5 seconds is the first condition that must be satisfied by a smoke signal. These times are clearly distinct from the passage of the wipers and from variation due to fog. In addition, these signals are many time larger than any rain signal or splash, and constitute the second condition that must be satisfied. Also, the time for the smoke signal to increase is always less than the time for it to decrease, the third condition. It is more difficult to make a signal output proportional to the amount of smoke. It would be preferable to have a binary output that is used to control the admission of outside air into the passenger compartment.

Figure 6:
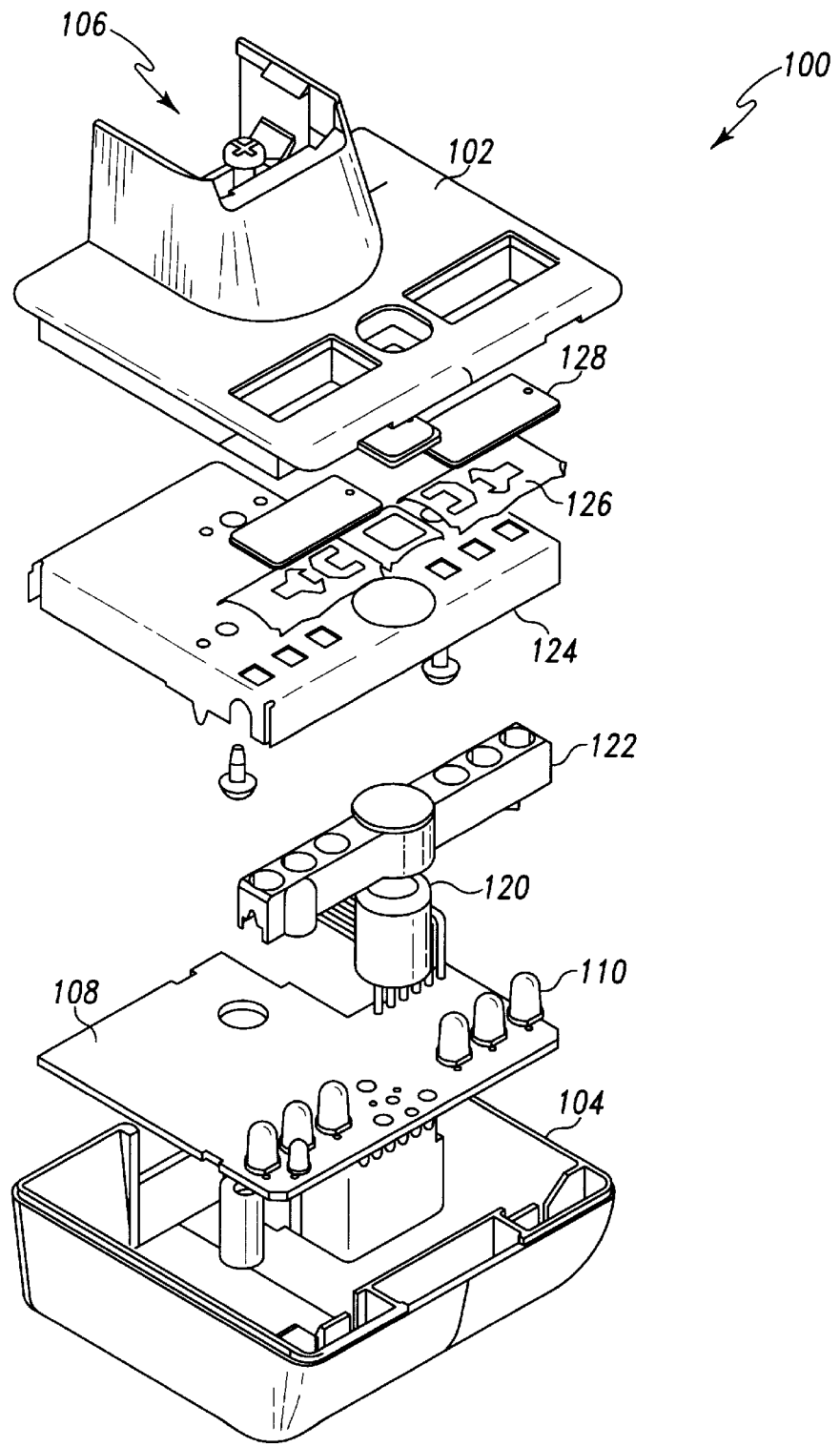
FIG. 6 is an exploded perspective view of a preferred embodiment rain/fog sensor of the present invention.

Referring now to FIG. 6, there is illustrated an exploded perspective view of a preferred embodiment physical configuration of a rain/fog/smoke detector according to the present invention. The preferred embodiment sensor is indicated generally at 100 and incorporates several components mounted within an upper an upper housing 102 and a lower housing 104. The upper housing 102 includes a mounting structure 106 to facilitate mounting the sensor 100 to the backside of an automobile rearview mirror. Within the housing 102, 104 is mounted an electronic circuit board 108 upon which is mounted the sensor 100 electronics, including plurality of LEDs 110 and a photodetector 120. The positioning of the LEDs 110 and the photodetector 120 are maintained precisely by a plastic LED positioner shroud 122 that fits over these devices and mounts to the circuit board 108. The circuit board 108 is covered by an electromagnetic interference (EMI) shield 124 which serves to reduce interference to the circuitry mounted upon the circuit board 108 from stray electromagnetic waves. The EMI shield 124 is conductive and is coupled to the ground line of the power supply. The EMI shield 124 contains cutouts therein which are complementary to the openings on the tipper surface of the LED positioner 122, thereby allowing light from the LEDs 110 to flow therethrough and also allowing light to reach the photodetector 120.

Figure 7:
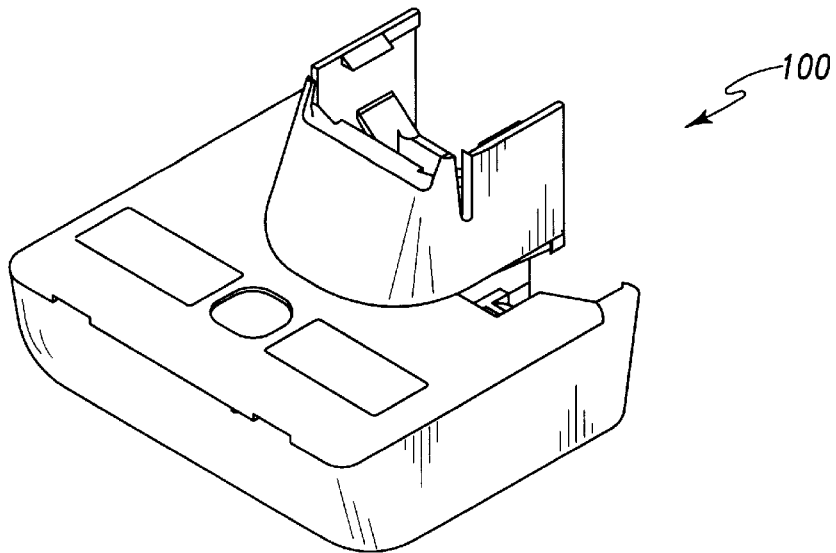
FIGS. 7 and 8 are perspective views of the sensor of FIG. 6.
Figure 8:
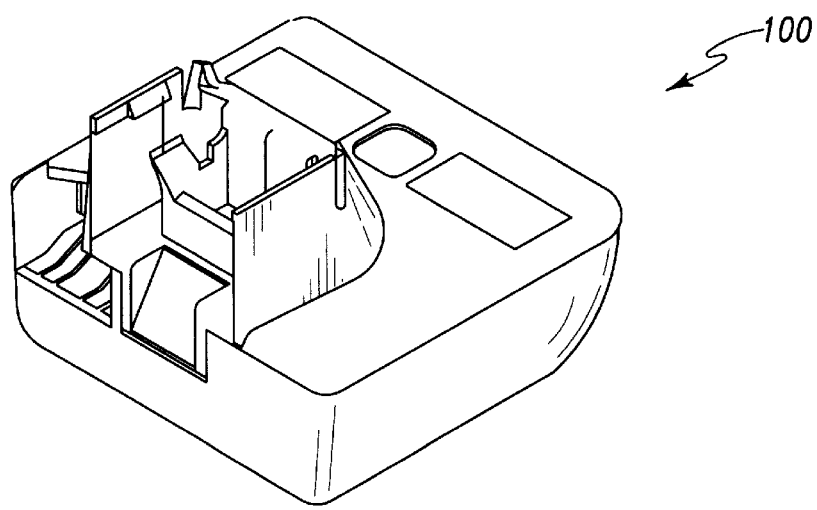

As described above, the placement of the light rays emitted by the LEDs 110 upon the surface of the windshield is critical to the functioning of the present invention. In order to control the portions of the windshield illuminated by the LEDs 110, a series of apertures 126 are placed above the EMI shield 124 directly within the path of the light emanating from the LEDs 110. One of the apertures 126 also limits the field of view seen by the photodetector 120. The sensor 100 utilizes only the infrared portion of the spectrum in order to illuminate the windshield and to detect direct and scattered light signals. The use of infrared frequencies provides several desirable advantages, among them the fact that the occupants of the vehicle will not be able to see the illumination of the portion of the windshield monitored by the sensor 100, and also a reduction in interference by common external illumination sources, such as street lights and oncoming headlights. As can be seen in FIG. 6, the upper housing 102 also includes apertures therein which allow light from the LEDs 110 to pass therethrough and which also allow light reflected and scattered from the windshield to pass to the photodetector 120. Front and rear perspective views of the sensor 100 are illustrated in FIGS. 7 and 8 respectively.

Figure 9:
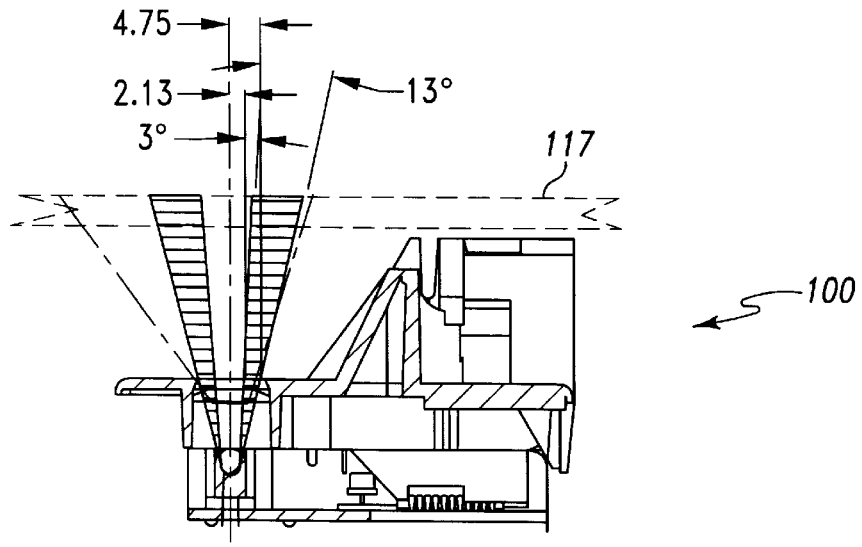
FIGS. 9 and 10 are cross-sectional views of the sensor of FIG. 6.
Figure 10:
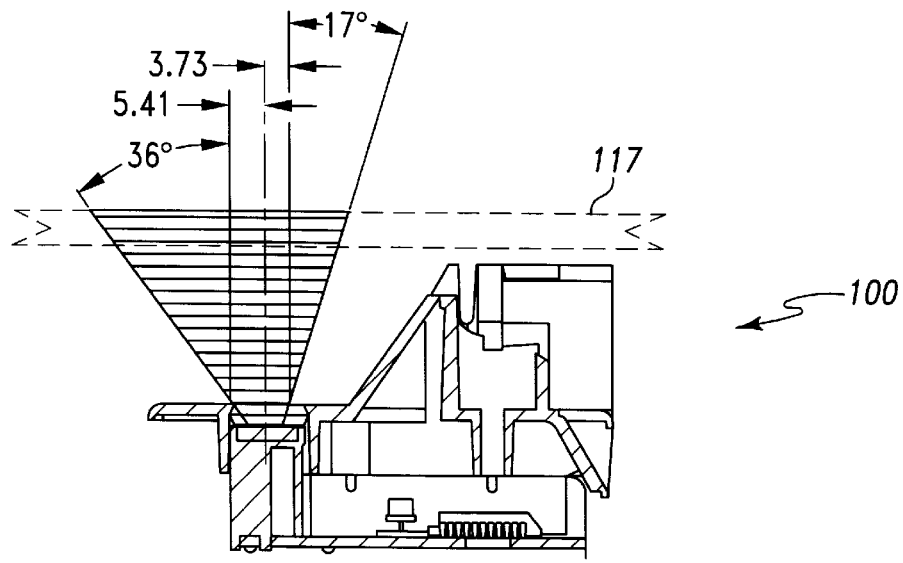

Referring now to FIG. 9, there is illustrated a cross-sectional view of the sensor 100, taken along a section line which passes through one of the LEDs 110 which illuminate the windshield 117 for rain sensing. FIG. 9 defines the preferred area for illumination by the LED 110, wherein the light pattern created by the aperture 126 is symmetrical about the center line. The LEDs 110 which illuminate the windshield 117 for fog sensing are apertured such that direct reflection of their light off of the windshield 117 strikes the photodetector 120. FIG. 10 illustrates a cross-sectional view of the sensor 100 taken through the center of the photodetector 120. FIG. 10 illustrates the viewing area of the photodetector 120 created by the apertures 126.

As described hereinabove, the sensor 100 is a self-contained detector of moisture on the interior and exterior surfaces of the windshield 117. The primary purpose of sensor 100 is to communicate with the wiper motor and to set the wiper speed accordingly. The sensor 100 may additionally communicate with the air conditioning and ventilation system. When sensing rain on the exterior of the windshield 117, the method of moisture detection is via light dispersion. The sensor 100 contains infrared ($\lambda$=880 nm) LEDs which project a pattern of light onto the windshield 117 that is dictated by the apertures 126. The photodiode 120 receives light from the area of the windshield being monitored. The apertures 126 mask the light such that direct reflection from the glass surface of the windshield 117 is prevented from striking the photodiode 120. When moisture is present on the windshield 117, it scatters the light striking the glass, sending the light back at different angles. A fraction of this scattered light returns to strike the photodiode 120, generating a signal. As the amount of moisture on the glass increases, the amount of light being scattered increases as well, resulting in an increase in the signal generated by the photodetector 120.

It has been observed that if fog forms on the interior surface of the windshield 117, a large amount of LED light will be returned to the photodiode 120, producing an output signal hundreds, or even thousands, of times greater than that of rain on the windshield 117 exterior. The sensor 100 compensates for this fog sensitivity by operating as a two channel device. Two of the LEDs 110 are used to produce a fog detector. The electronic circuitry within the sensor 100 alternates between rain detector and fog detector signals and the two are combined appropriately as described hereinbelow.

The LEDs 110 used for the fog detector channel have apertures 126 thereover which do not prevent the photodiode 120 from detecting light reflected directly off of the windshield 117. Therefore, as fog forms on the interior surface of the windshield 117, the amount of light being scattered increases, thereby decreasing the amount of directly reflected light received by the photodetector 120. This is in contrast to operation of the sensor 100 as a rain detector, wherein increased scattering of the light by the water on the exterior of the windshield 117 causes an increase in the amount of light being received by the photodetector 120. It should be noted that because of the much higher level of reflected light when operating the fog channel LEDs 110, the gain of the amplifier chain within the sensor 100 is reduced during operation of the fog channel in order to keep the resultant output signal in the linear range.

While there is a very good correlation between increases in the signal from the rain detector channel and decreases in the signal from the fog detector channel as fog forms on the interior surface of the windshield 117, the level of correlation is not sufficient to provide an exact correction by simply subtracting the fog detector data from the rain detector data. In other words, the sensor 100 cannot determine in all cases whether or not actual rain is present at the windshield exterior surface with varying fog conditions. Fog appears to be most problematic at vehicle start up, particularly on cold and/or humid mornings. In this case, the actual fog present on the windshield 117 is usually thick, and tends to thicken further for a few minutes before it clears. Actual fog also appears to occur at the start of a rain storm, or when actual rain increases. It is also more prone to occur with more passengers in the car, if the windows are rolled up, and if the climate control system is turned off. Hence there are a variety of conditions where actual fog occurs, with or without actual rain occurring.

The first step in correcting for fog is to verify if there is fog present on the windshield 117. The determination is based on the difference in signature between the fog and the rain signal. Generally, variations in the rain signal due to fog are much slower changing, are of a greater amplitude and have lower high frequency components than fluctuations in the fog channel due to actual rain. The fog signal is analyzed and a determination is made as to whether fog is present or not by the presence of a relatively slow moving component on the fog detector channel. If fog is determined to be present, the control program of the sensor 100 incorporates this fog signal into the overall algorithm in determining windshield wiper wipe frequency.

The sensor 100 alternates between operation of the rain detector channel and the fog detector channel every 30 ms, thereby providing a pair of data points (one from each channel) every 60 ms. The rain channel and the fog channel both are able to detect either rain on the exterior of the windshield or fog on the interior of the windshield. However, because the rain channel detects scattered light and the fog channel detects directly reflected light, the presence of rain and/or fog produces different output signal characteristics from the two detector channels. The two detector channels can be used independently or in concert with one another. For example, the output of the rain detector channel may be used independently to sense the presence of rain on the windshield and this determination may be used to control the automobile's windshield wipers. Similarly, the output from the fog detector channel may be used independently to determine if fog is present on the interior of the windshield, and this determination may be used as an input to the vehicle climate control system (e.g. the windshield defogger).

In a preferred embodiment of the present invention, however, the microprocessor which controls the sensor 100 uses the output from the rain detector channel and the fog detector channel together in order to make a more accurate determination of whether rain and/or fog are present on the windshield. The microprocessor may be programmed with a control algorithm which examines several different factors in the outputs of the rain and fog detector channels in order to arrive at a determination of whether rain is present on the exterior of the windshield and whether or not fog is present on the interior of the windshield. The particular combination of the factors examined by the microprocessor and the relative weight assigned to each factor will vary depending upon the application that the sensor 100 is used in, such variations being caused by factors such as mounting position of the sensor 100, angle of the sensor 100 with respect to the windshield and with respect to the ground, etc.

One of the factors which may be considered by the sensor 100 microprocessor is the raw magnitude of the signal produced by the rain detector channel and the signal produced by the fog detector channel. For example, with rain present on the exterior of the windshield and no fog present on the interior of the windshield, the output of the rain detector channel will increase while the output of the fog detector channel will decrease. Similarly, with fog present on the interior of the windshield but no rain present on the exterior of the windshield, both the rain and fog detector channel outputs will increase. The output of the rain detector channel increases in this situation because the fog on the interior of the windshield also produces scattering of the rain detector LED light, thereby increasing the amount of scattered light detected by the photodetector. This is an example of why the sensor 100 preferably incorporates a determination of whether there is fog on the interior of the windshield as part of its decision of whether there is rain on the exterior of the windshield. By being able to sense fog conditions, the rain detector function of the sensor 100 is made much more accurate, and thereby phantom wipes (activation of the windshield wiper when there is no rain present on the exterior of the windshield or when the amount of rain present on the exterior of the windshield does not justify a wipe) are dramatically reduced or eliminated.

Another factor which may be considered by the microprocessor controlling the sensor 100 is the relative frequency with which the outputs of the rain detector channel and the fog detector channel change. Fog formation and decay on the interior of the windshield is a relatively slow process compared to the act of a raindrop hitting the exterior of the windshield. Fog tends to relatively gradually accumulate as water vapor in the air is deposited onto the surface of the windshield. In contrast, a raindrop falling from the sky deposits a relatively large amount of water into a relatively small space almost instantaneously. Therefore, when a raindrop hits the windshield in the area monitored by the fog detector channel, the output of the fog detector channel undergoes an abrupt drop caused by scattering of the fog detector channel light by the raindrop. Such an abrupt drop in the sensor output would be termed a high frequency change. Such abrupt changes do not occur in the fog detector channel output with fog build up. Instead, the output of the fog detector channel will increase or decrease in a fairly smooth, continuous manner with fog build up. Analyzing the frequency of change of the rain and fog detector channel signals will therefore provide much information to the microprocessor which is useful in determining whether the sensor 100 is detecting rain, fog or both.

Another factor that may be considered by the rain sensor 100 microprocessor is the long term drift of the signal produced by the rain detector channel. The effects of fog may be subtracted by the data produced by the rain detector channel by fitting a straight line to the rain detector channel data. If such a line fitting procedure indicates that there is a trend to the data produced by the rain detector channel, then this is probably due to the formation of fog on the interior of the windshield. This long term drift may then be subtracted from the data produced by the rain detector channel, and the microprocessor will then be looking for perturbations around the long term drift line. Such perturbations indicate the presence of rain impinging the windshield.

Another factor that may be considered by the microprocessor of the sensor 100 is the detected rain threshold which will be used to activate the windshield wiper. In order to avoid annoyance of the operator of the vehicle which incorporates the sensor 100, it is desired to minimize phantom wipes. If long term drift is detected by the data produced by the rain detector channel, then the sensor 100 may desensitize the rain threshold which will cause the wiper motor to be activated. In other words, the microprocessor may require a relatively quick change in the output signal in the rain detector channel in order to activate the windshield wipers. On the other hand, if no long term drift is detected in the rain detector channel output, the microprocessor may activate the wiper motor on a lower threshold (i.e. a slower change to the output signal from the rain detector channel).

The factors described hereinabove for consideration by the sensor 100 relate to determining when to activate the windshield wiper motor when the windshield wiping system is set to an intermittent wiping mode. When a continuous wiping mode has been selected by the vehicle operator, then the sensor 100 must decide between operating the windshield wiping system at a low or high speed (or a plurality of speeds therebetween). In such a mode, it may be desirable to choose different criteria for operating the windshield wiper motors than are used during intermittent wiping mode. In particular, the method of examining the rain detector channel output for a build up to a threshold prior to activating the windshield wipers, which is useful in the intermittent wiping mode, cannot be used in a continuous rainstorm. In such a situation, the rain hitting the windshield occurs at such a fast rate that the signal from the rain detector channel will almost always be greater than the preestablished threshold. Instead, it may be desirable to program the microprocessor of the sensor 100 to look at the amount of fluctuation in the high frequency component of the rain detector channel output signal. In particular, it is desirable to examine the standard deviation of the rain detector channel output signal about the mean of this channel. The greater the calculated standard deviation, the faster the windshield wiper motors should be operated in the continuous mode.

It will be appreciated by those skilled in the art that by incorporating both the rain detector channel which senses scattered light and the fog detector channel which senses directly reflected light, great flexibility is provided in programming the microprocessor control algorithm of the sensor 100. There are many characteristics of the rain detector and fog detector channel outputs that may be considered by such a control algorithm in order to arrive at an output signal which is used to control the windshield wiper motors. This allows great flexibility in designing the control algorithm to match the particular application in which the sensor 100 is to be used.

Figure 11A:
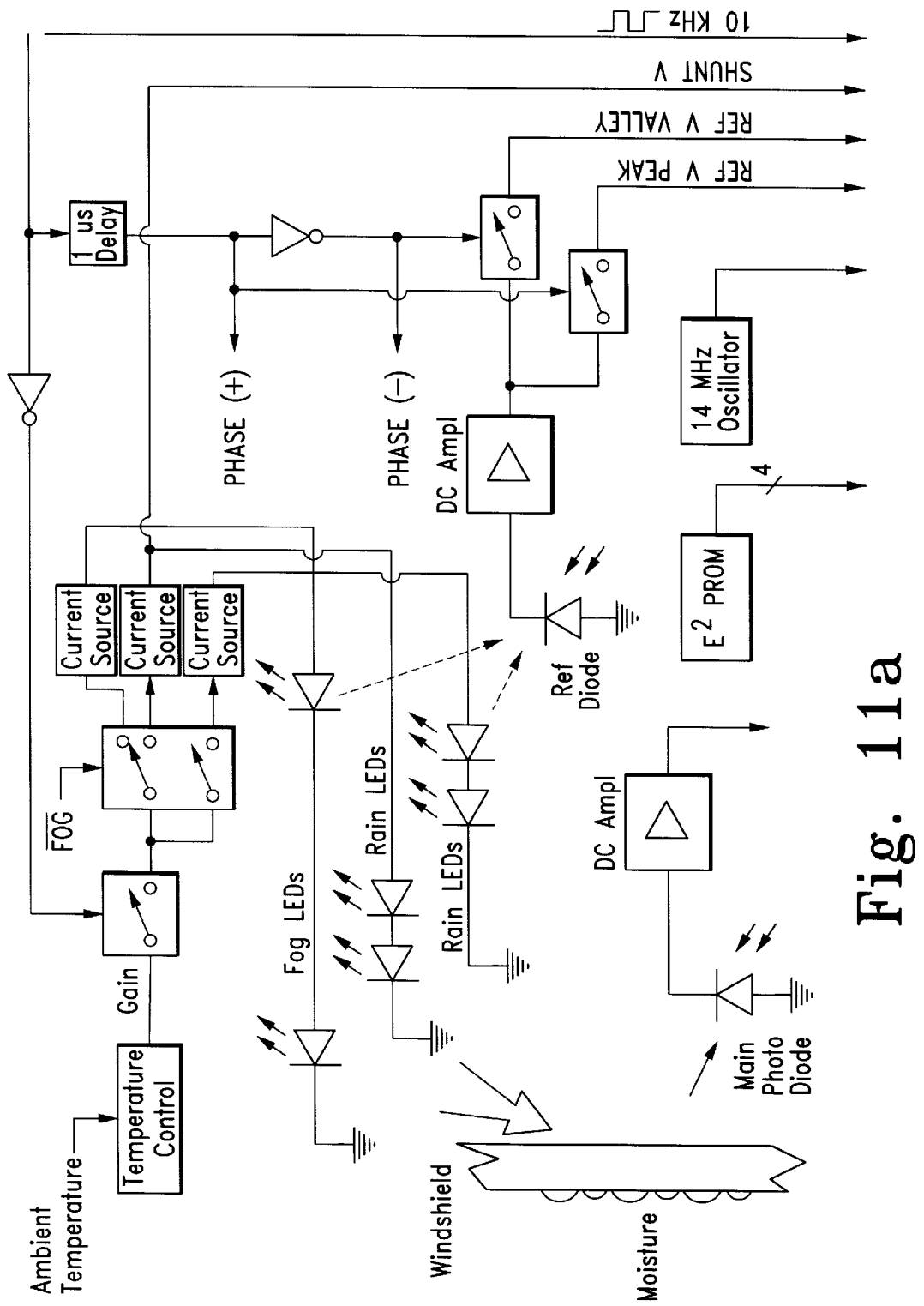
FIG. 11 is a function block diagram of the sensor of FIG. 6.
Figure 11B:
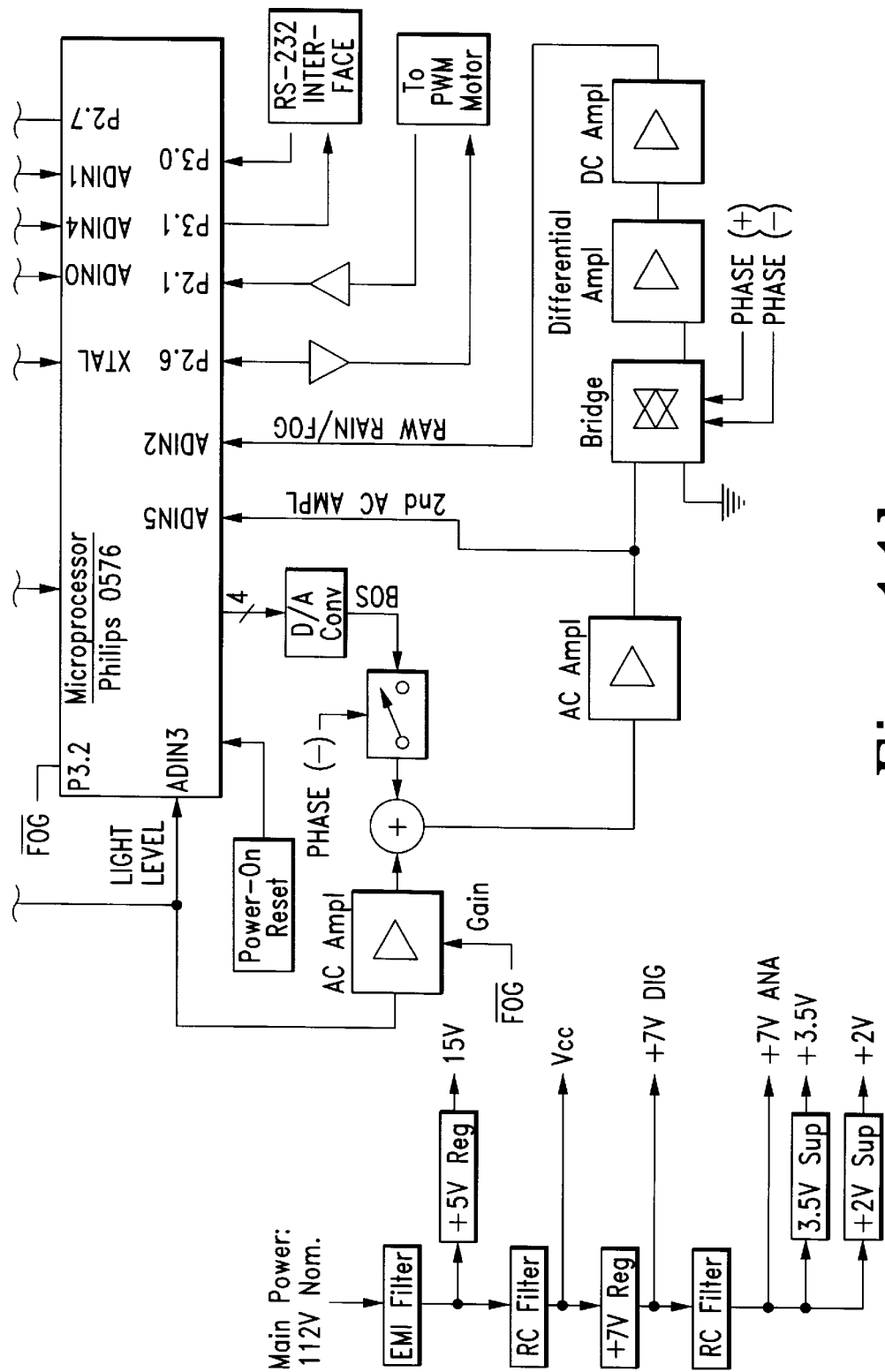
Figure 12A:
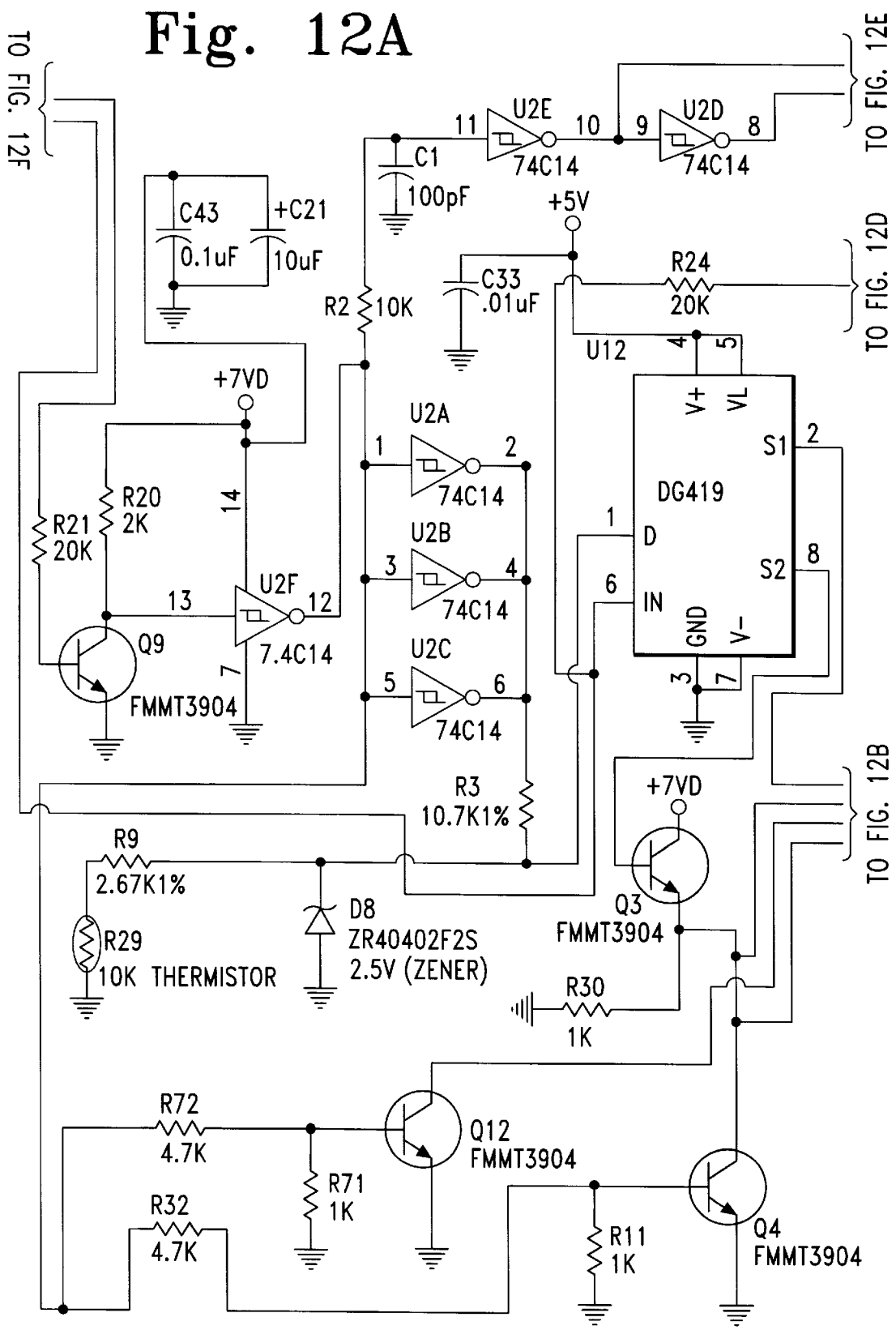
FIGS. 12A–H are an electrical schematic diagram of the sensor of FIG. 6.
Figure 12B:
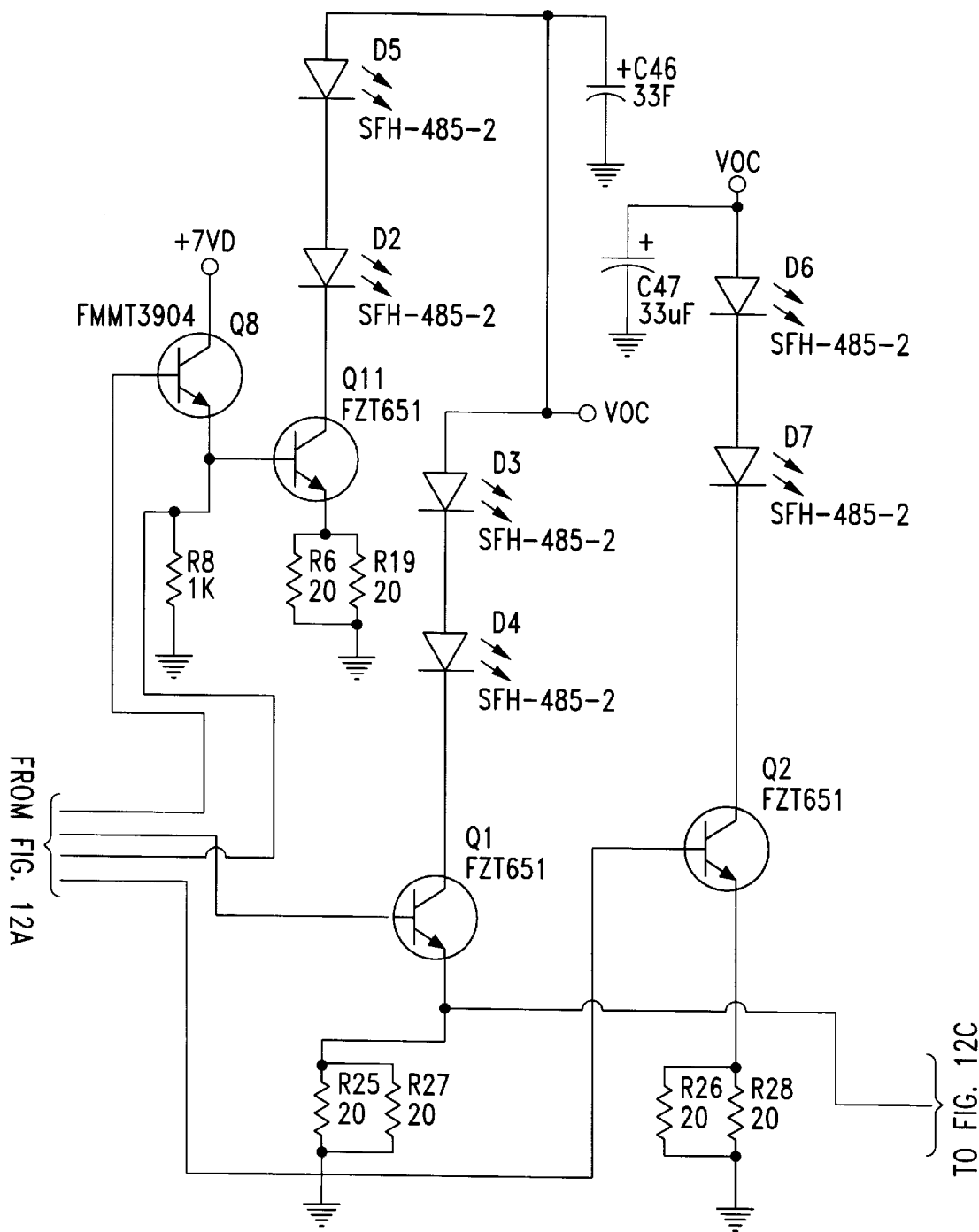
Figure 12C:
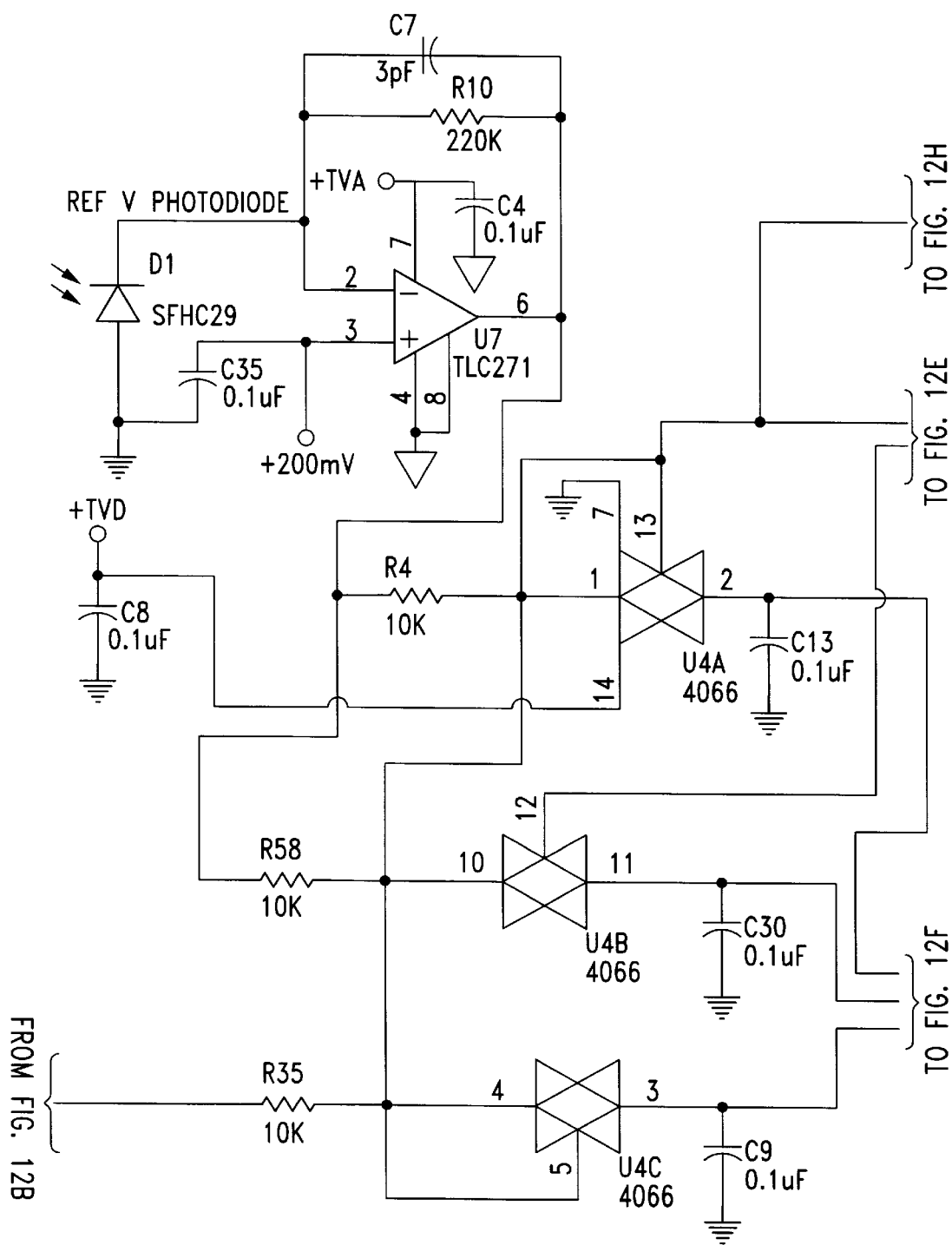
Figure 12D:
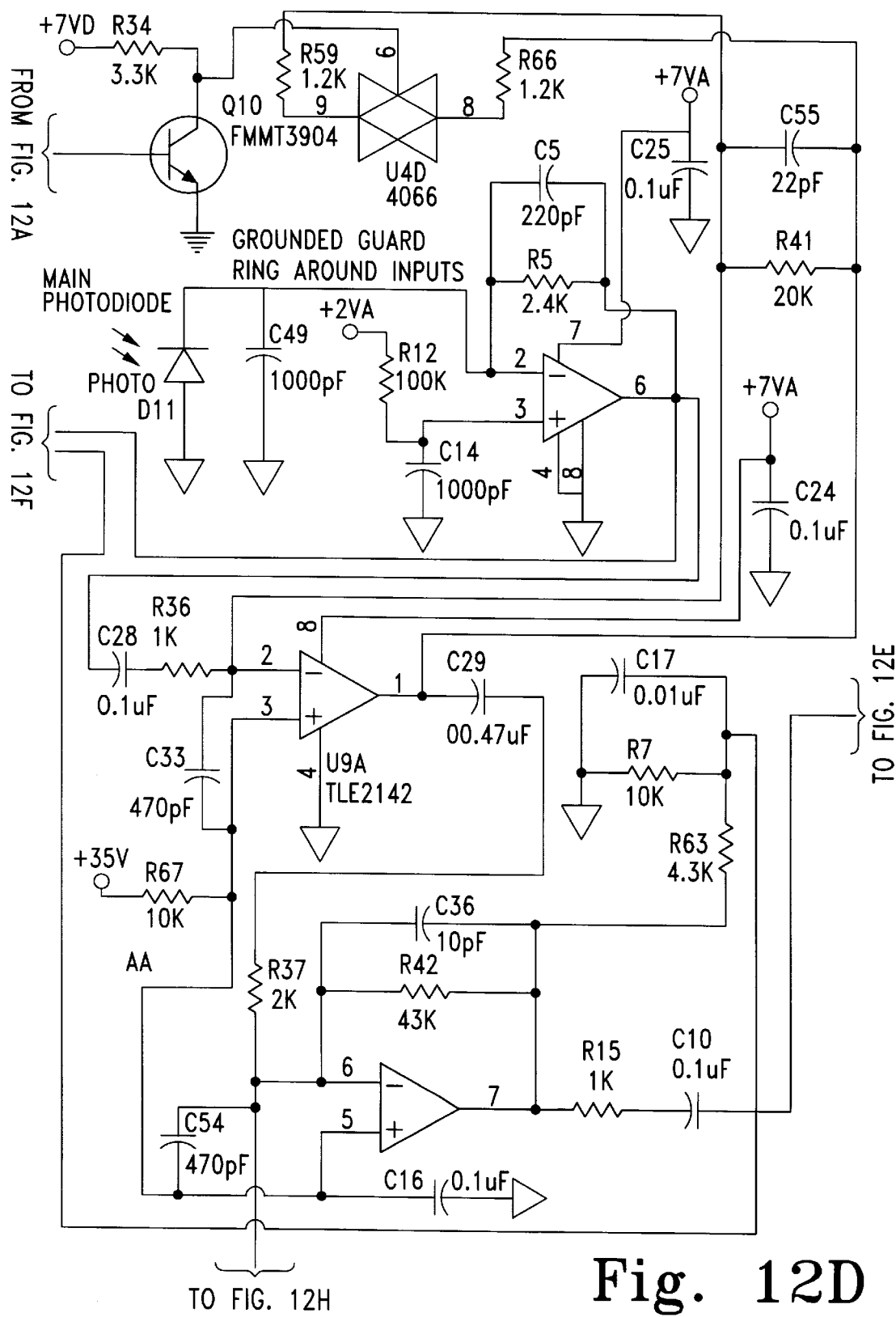
Figure 12E:
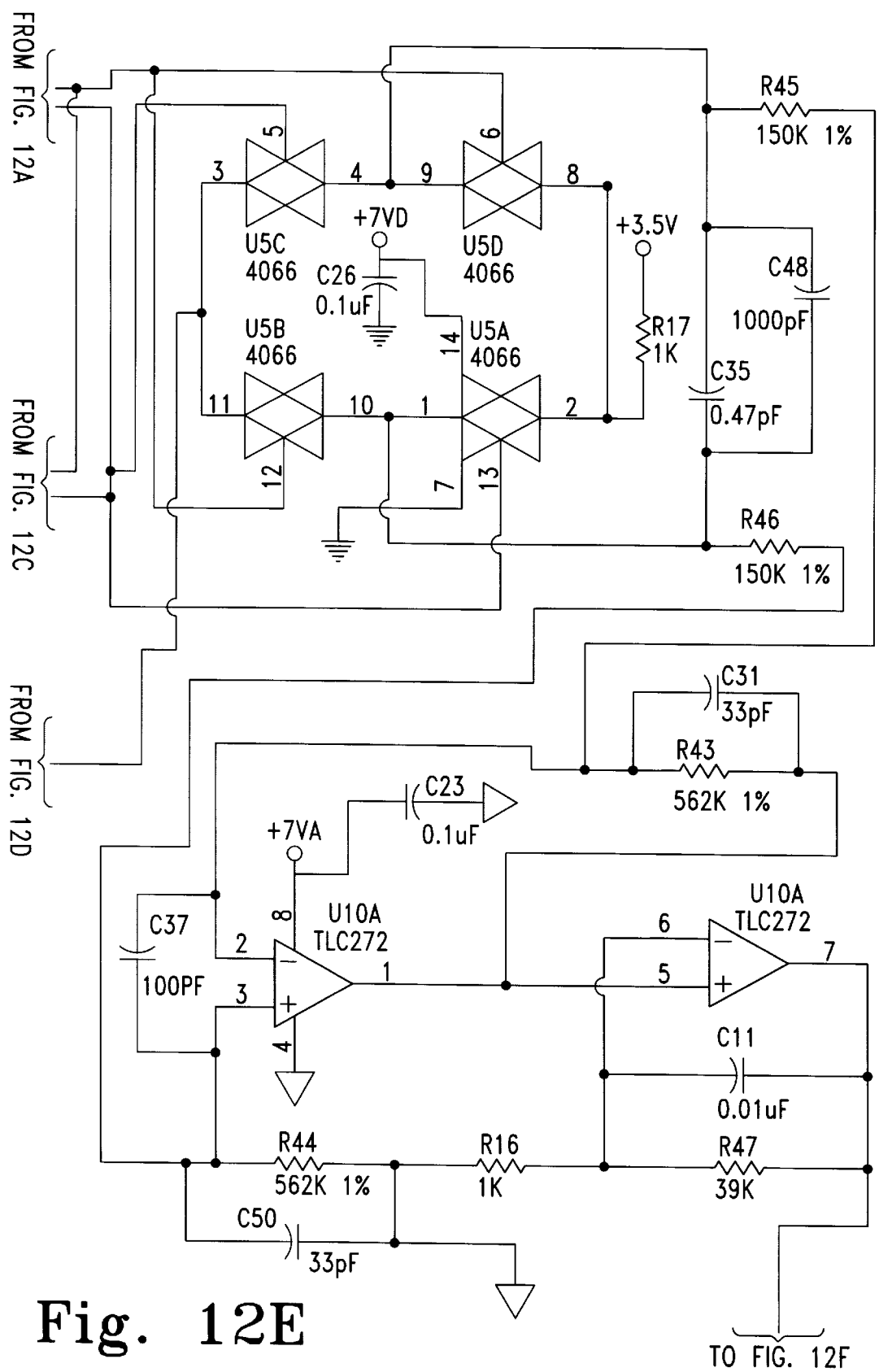
Figure 12F:
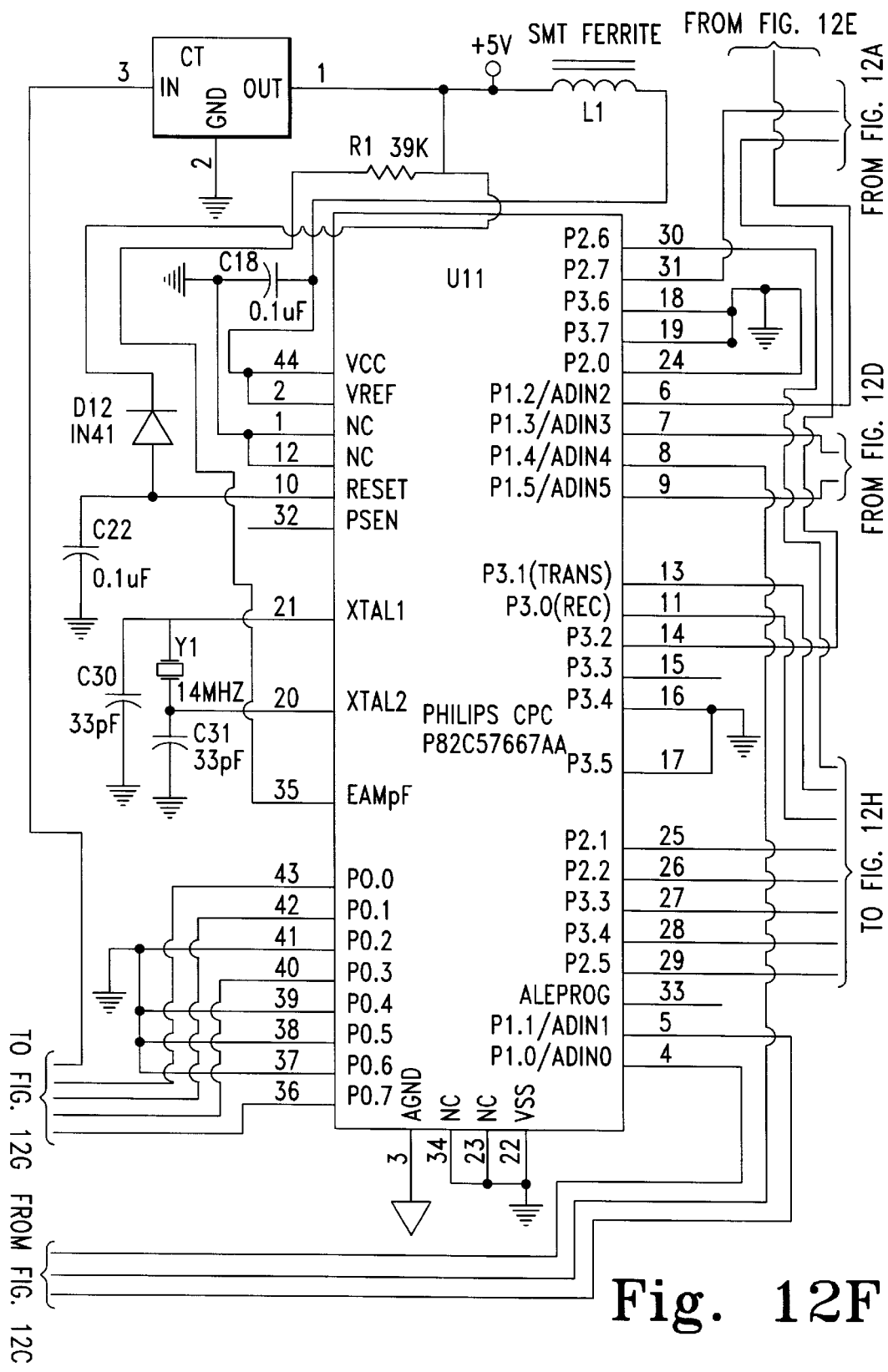
Figure 12G:
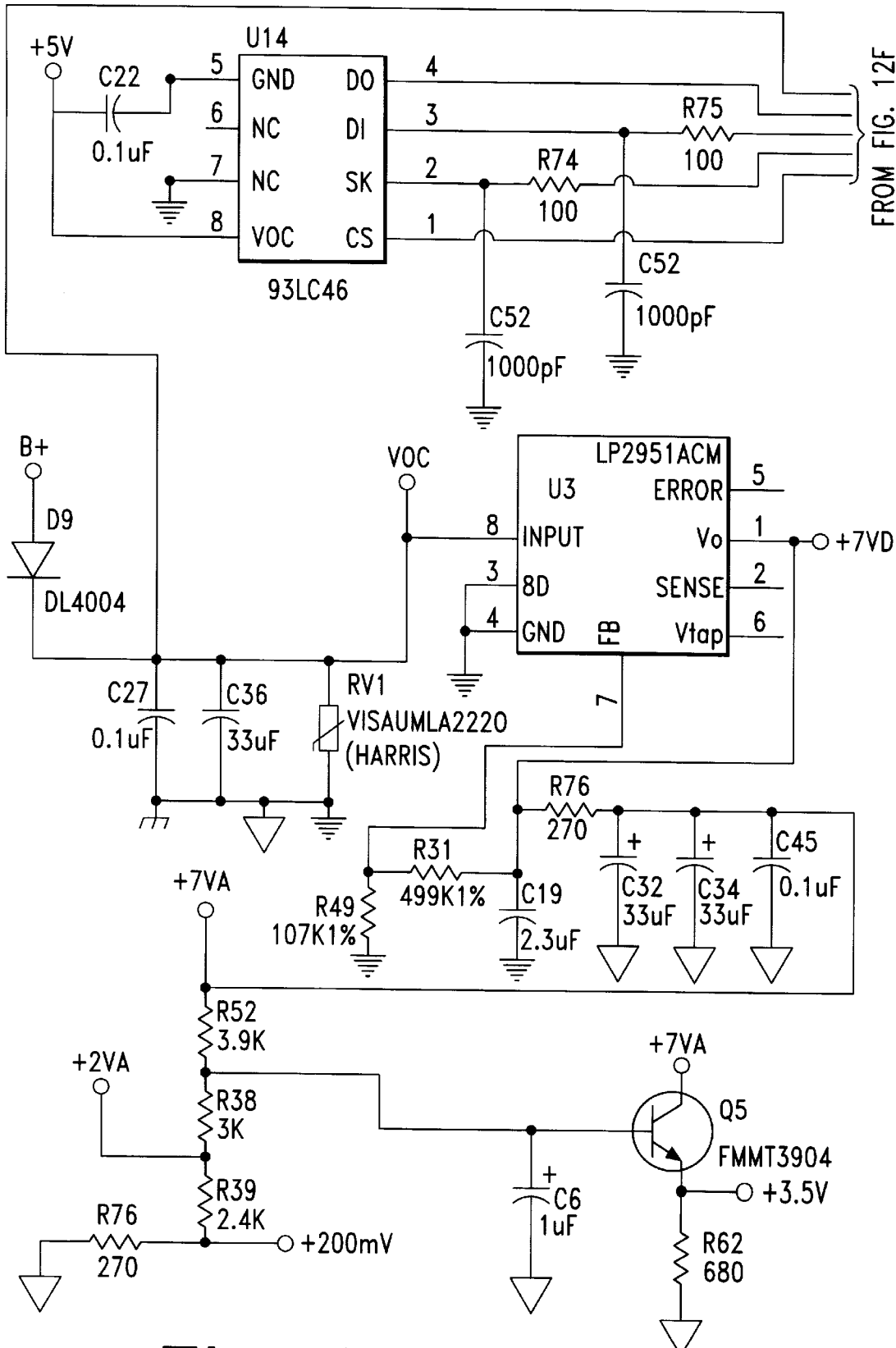
Figure 12H:
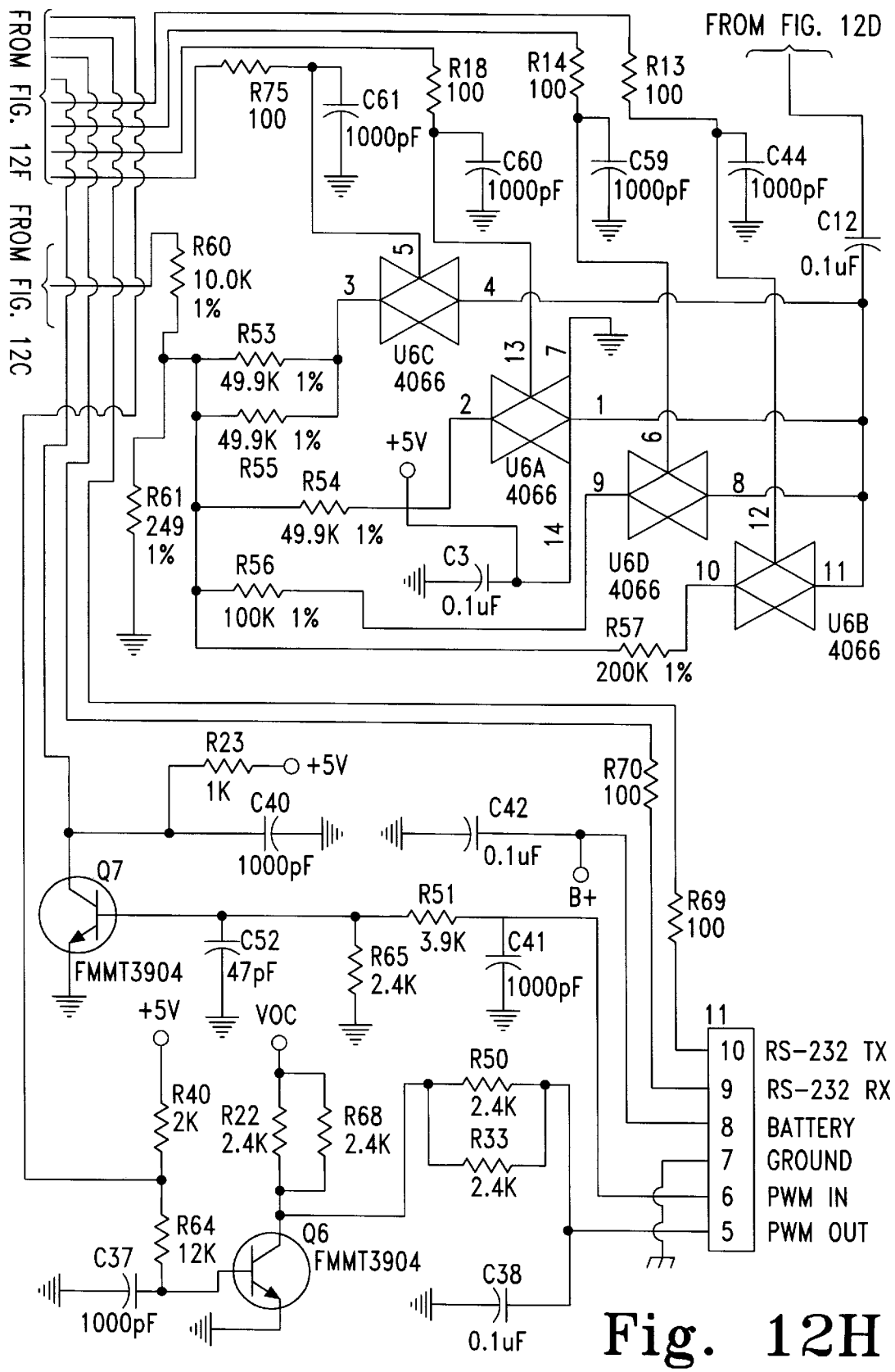
Figure 13:
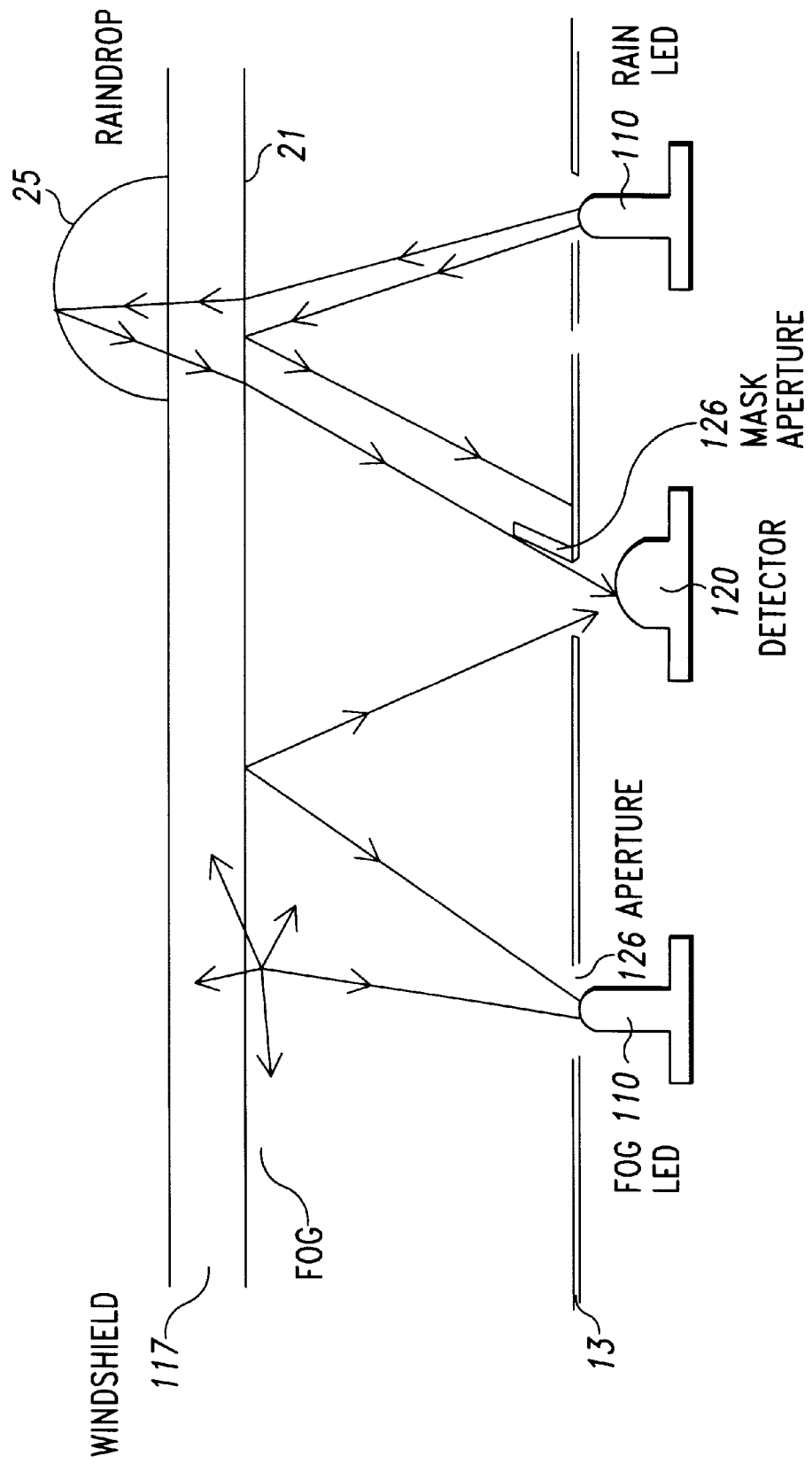
FIG. 13 is a schematic cross sectional side view of a portion of the rain/fog sensor of the present invention in use near a vehicle windshield, showing the typical paths traversed by light rays during use of the invention.

A function block-diagram of a preferred embodiment of the sensor 100 is illustrated in FIG. 11. An electrical schematic diagram of the preferred embodiment sensor 100 is illustrated in FIGS. 12A–H. A schematic side elevational view of the present invention in use with a vehicle windshield is illustrated in FIG. 13, showing the paths typically traversed by light rays during use of the present invention.

The preferred embodiment sensor 100 incorporates several features which increase the practical usefulness of the device in many real world situations. These are outlined as follows:

Ambient Light

External sources of light—the sun, headlights from oncoming cars, etc.—will also strike the photodiode; for this reason the LEDs 110 are driven by a square wave current. This AC signal is preferably at 10 kHz, which is sufficiently fast to capture the signal of interest. The photodiode 120 signal is amplified first by a DC coupled transimpedence amplifier, then a series of AC coupled amplifiers, and than a lock-in amplifier. The lock-in amplifier rejects any signal not synchronized to the 10 kHz drive signal. Finally, the signal is rectified and low-pass filtered, to produce a so-called "Raw Rain" signal. This signal is a DC representation of the peak LED light striking the photodiode 120 and is digitized by a ten-bit A/D converter resident in the microprocessor of the sensor 100.

Dynamic Range Extension

If the LED 110 light striking the photodiode 120 exceeds a certain level, a background negative offset is injected into the input of the second AC amplifier, effectively subtracting a fixed amount from the signal representing the photodiode current. In this manner, the dynamic range of the amplifier is extended. There are sixteen such background offset levels (including the one case where no offset is introduced). The offsets are produced by four resistors that may be switched into the signal path under microprocessor control, thereby producing sixteen attenuation combinations (including the case of no attenuation). Because of manufacturing tolerances in the resistors, the actual attenuation of each resistor is measured at the time of manufacture and all sixteen actual attenuation levels are stored in nonvolatile memory (such as $E^2PROM$) at the time of manufacture. These values are termed BOS(n), where n corresponds to the particular offset step used. Each BOS(n) is used in software to effectively "boost up" the Raw_Rain signal to what it would be if the amplifiers had sufficient range. The result of this is a four-bit extension of the Raw_Rain signal, effectively producing fourteen bits of rain data.

Photodetector Linearization

If the photodiode 120 is linear over the entire range of full darkness to direct sun, then no optical filtering would be necessary. Actual photodiodes do exhibit some nonlinearity, particularly at higher light levels, necessitating an optical bandpass filter 18 to cut down on the total energy the detector receives. This filter 128 is mounted to the housing of the sensor 100 and limits the wavelengths of light striking the photodiode 120 to those similar to the LED 110 light output. To address the remaining nonlinearities, a software correction of the Raw_Rain due to light level (as measured from the transimpedence amplifier output) is used. This software correction applies a correction curve that removes any nonlinearities in the nominal response of the photodiode 120.

Thermal Derating of LED

In order to maximize the amount of LED 110 light being received by the photodiode 120, the LEDs 110 are driven at their maximum drive current. This maximum drive current is dictated by the LED's pn junction temperature which in turn is affected by the ambient temperature. A thermistor circuit is employed where the drive current to the LEDs 110 is reduced as ambient temperature increases, maintaining the device within its safe operating range. At higher temperatures, less light is projected onto the glass producing a smaller signal at the photodiode 120. A software correction coefficient is used to back out this effect in the resulting signal.

In addition to thermally derating the LEDs 110, the thermistor will indicate when the temperature is above a preset, maximum value. If this point is reached, the microprocessor disables the LED 110 drive altogether, allowing the system to cool back to normal operating conditions. As soon as the temperature is acceptable, the unit will resume operation. During any shutdown mode, the sensor outputs a fault signal to the wiper controller to provide a fallback operation.

Optical Feedback

To correct for inherent variations in the light output of the LEDs 110 (thermal, drift, device variations, etc.), there is another photodiode placed adjacent to two of the LEDs to monitor their light output. A so-called "Ref_V" signal is the output of this reference photodiode. It is largely insensitive to external effects (rain, fog) and simply indicates LED 110 brightness. This parameter is then used to normalize the signal that the main photodetector 120 generates, providing ratiometric operation of the system 100.

Electrical Offset

The amplifier chain that the resulting detector signals are passed through has a net gain of approximately $3 \times 10^8$. While this circuit is quite linear, it may introduce a small offset into the output; i.e., if the output voltage vs. light striking the photodiode 120 is plotted, the resulting straight line may not go through zero. To compensate for this, an offset term "OS" is measured at the factory test and stored in the on-board $E^2PROM$. This value is then later used by the firmware to mathematically correct for this effect.

Driver's Preference

The sensitivity of the wiping system to a specified amount of moisture on the windshield is set by the vehicle operator through the wiper control stalk settings. Each setting, as communicated to the sensor 100, modifies the "Sensitivity" parameter, thereby increasing or decreasing the amount of water on the glass required to activate a wipe.

Complete Algorithm (Preferred Embodiment)

For the case where fog is determined to be not present, the algorithm still uses both the rain and fog channel for information on the predicted amount of moisture on the windshield. For this, the net change from a "clean condition" (the value immediately following a wipe) is tracked versus time. If this difference exceeds a preset threshold, a wipe is initiated. There is also a calculation to predict when in time that trigger point should be. If this time period elapses without the rain difference exceeding the threshold, a wipe is initiated regardless and the process repeated. The fog channel contributes by having an increase in signal when water is present on the outside of the glass.

When fog has been determined to be present, the above algorithm is merged with an algorithm that observes the rain/fog characteristics and reacts accordingly. The first part of the algorithm backs out the fog effects from the rain channel, the second half utilizes the fact that the fog channel undergoes sudden shifts whenever a drop of water falls on the windshield flass. Whenever the fog channel exhibits a sudden shift above a certain level, the effect is attributed to water on the glass and a wipe is initiated.

Depending upon how much the corrected rain/fog signal exceeds the necessary thresholds, the time history of the corrected rain signal, and the sensitivity setting of the wiper stalk switch, the sensor will request one intermittent wipe, several wipes, low speed wiping, or high speed wiping. This request signal is constantly updated, so changing rain conditions will cause changing wipe rates, including no wiping. Changing the wiper stalk switch setting will also change the wipe rate accordingly.

The following is a summary of the software algorithms and techniques that the preferred embodiment sensor 100 uses in acquiring data from the sensor 100 hardware and determining the appropriate wipe rate. The algorithms are broken up into low level and high level routines. The lower level routines are responsible for acquiring the data from the 10 bit analog-to-digital converter (ADC) and formatting this data for the higher level routines to work with. The remaining routines will accept this formatted data and perform the necessary decision making in order to control the wipe rate.

Low Level Routines

Timers

The primary timer uses hardware timer 2 on a Philips 8051 family microprocessor (Philips C576). This timer is set up to generate an interrupt every 1.25 msec. In addition, there are the following timers:

t1 An 8 bit counter/timer. Reset whenever the wiper leaves or enters the in wipe position, and is used as a time-out in case the change in wiper position message is not received from the wiper controller. Also used to create a 100 millisecond, and in turn, a 20 second timer which causes an addition to the wipe threshold to decay.

t2 An 8 bit counter/timer. Set whenever a change in background offset occurs, and averages are not valid. Timer is incremented to zero, at which point, quantities which are derived from averages are set to new values.

logtm An 8 bit counter/timer. Used to divide 10 milliseconds down to 500 milliseconds and trigger logging.

t3 A 16 bit counter/timer. Reset whenever a wipe occurs and is used to trigger time-out wipes. Also used to time 60 seconds, when the clean-windshield value is set to the current average.

Serial Link (USART) Interrupt

Hardware timer 1 of the 8051 is used to generate the baud rate for the serial link. The baud rate is 9600, 8-bits, no parity, one stop bit. An interrupt occurs whenever the receive buffer is full (character received), or the transmit buffer is empty (character sent). The interrupt service routine determines which occurred. If a character has been received, it is copied to a variable and processed at non-interrupt time. If a character has been sent and the transmit buffer is not empty, the routine starts sending the next character. The serial link is used only for diagnostic functions at the factory.

PWM Interrupt

Whenever a transition (low to high or high to low) takes place on the controller-to-sensor PWM line, an interrupt occurs. The interrupt service routine copies the difference between a hardware clock and the value of the clock at the last interrupt time to variables which are processed at not-interrupt time.

Watch Dog Timer

A dedicated hardware timer is preset to a specific value each time through the main loop of the program while at regular, frequent intervals, it is decremented by the hardware. Should the counter be decremented down to zero, indicating that the main loop has been corrupted, the microcontroller is reset and program execution is restarted from the beginning.

A/D Acquisition

Every primary interrupt (1.25 ms) an acquisition is triggered for four of the five ADC channels (rain or fog, ref_v_pk, ref_v_val, light_level, ac_lamp). The signals acquired are:

rain or fog: The signal from the hardware indicating the amount of light being received by the main photodiode 120 when either the rain or the fog LEDs 110 are activated. This signal roughly corresponds to the amount of light being scattered/reflected from the windshield 117 due to the glass, rain and fog. The actual type, rain or fog, is determined by a signal under software control.

$ref_{13}$ v_pk, ref_v_val: These two signals indicate the amount of light being received by the reference photodiode monitoring the light level of the rain/fog LEDs 110. As the LEDs 110 are driven by a square wave to reject DC illumination levels, these two signals correspond to the maximum and minimum of the reference signal during this square wave.

light_level: The signal that is generated by the main photodiode 120 prior to the DC component of the light being removed. This corresponds to all the energy being received by the photodiode 120 (LED+ambient).

ac_amp: This signal is used to measure a system characteristic where under rapidly changing light level conditions, the lock-in amplifier circuitry would saturate due to the differentiating effects of the circuit. The software will use this signal to ignore data when under these conditions.

The acquisition takes place within hardware and, when all channels are completed, an interrupt is generated.

The resulting 10 bit ADC value is placed in two 8 bit memory mapped locations with the remaining bits undefined.

Data Generation

Sixteen of the ADC samples are taken and summed to variables temp_rain and temp light level, providing 16 bits of information for each of these variables. The contents of temp_rain is either rain information or fog, depending on the state of the controller. Variable temp_light_level contains the summed value for light_level.

Variable temp_ref, which is the summed/average value for the reference photodiode output, is calculated by taking the difference between ref_v_pk and ref_v_val. This provides a means of subtracting out the DC ambient light from the 10 kHz modulated LED energy, leaving only the contribution of the LED 110 light.

Once all sixteen samples are acquired, the summed values are placed in variables uncollected, ref_v, light_level. The rain/fog flag is toggled so that during the next sixteen samples the alternate signal is acquired. An additional flag is set indicating to the foreground operations (non-interrupt) that a new sample has been acquired.

The time required for all sixteen samples is 20 milliseconds. Eight more samples are acquired but are discarded, giving a total acquisition rate of 30 msec for each rain and fog, a total of 60 msec for a pair (rain and fog).

Main Program Loop

The top level component of the program consists of an infinite loop (do . . . forever) where the individual tasks are executed on a sequential basis without (with the exception of the interrupts) preemption. Within the loop are the following:

1) Check the serial channel for incoming data. If a character has been received over the serial connection, execute the command associated with that character.

2) Check system time, if it is time to log results, format the selected variables and send to the serial transmit buffer.

3) For data from the wiper motor controller: If the stalk setting has changed (the stalk position is sent from the motor controller to the sensor 100 via the PWM connection), interpret the change. If the wiper position has changed (the wiper position is sent from the motor controller to the sensor 100 via the PWM connection), interpret the change.

4) If a new set of data has been prepared by the analog interrupt routine described elsewhere, convert to corrected data.

5) If two conversions to corrected data have been done (this usually means that new data for both rain and fog are available, except in some debugging), interpret the data to see what, if any, wiping is required.

High Level Routines

System States

Resting on the low level architecture, is a set of system states that determines the course of action the program will take for a given input or value of corrected rain/fog. These states are driven by the driver, the rain/fog data, system time, and hardware conditions.

The program states are as follows:

washing A wash has been selected by the driver. If finished, capture new values associated with clean windshield and resume previous state.

idle The stalk is in the off position. Maintain averages, background offsets, and so on, in case stalk position is changed.

manual The driver has selected full low or high speed wiping. Maintain averages and background offsets in event stalk position is changed.

powering up The system has just been started. Get offsets correct and averages established quickly.

watching The stalk is in an intermittent position, but wiping has not occurred for sixty seconds. Update averages every sixty seconds, and check to see if wipe is required.

warm start The system has initiated a wipe from the watching state. Wait for wiper to finish.

cold start A wipe has been initiated because the driver has changed the stalk position. Wait for wipe to finish.

start delay Wait until representative values are available following a warm or cold start. Determine whether to go into intermittent or watching state.

intermittent wipe The system has initiated a wipe from the intermittent watching state. Wait for wiper to finish.

intermittent delay Wait until representative values are available following an intermittent wipe. But check to see if wipe is needed immediately.

intermittent calc Compute amount of rain actually removed. Update expected time until next wipe.

intermittent watch See whether conditions from rain and/or fog channels require wipe. See if expected time to wipe. If neither occurs within sixty seconds, go to watching. If several wipes have occurred in quick succession, go to low speed.

low speed When each wipe is finished, compute amount of rain. Continue in low speed, go to high speed or go to intermittent watching.

high speed When each wipe is finished, compute amount of rain. Continue in high speed, go to low speed.

failure The program has gone to this state because it has not been able to obtain good readings. Keep trying to obtain good readings, and wait for stalk setting to change.

Stalk Processing

The user's stalk position is communicated to the sensor 100 as a PWM message. Every 30 msec, the sensor 100 analyzes the PWM interface to update the internal stalk setting register. If the value being transmitted is the same as the previous reading, no further action is taken.

In the event that the reading indicates a new stalk setting as set by the user, the system updates the stalk setting register which is used by the wipe determining algorithm in terms of the thresholds used in its comparisons. Specific actions taken when a new stalk setting has been registered are as follows:

1) If the active position is wash, don't do anything.
2) If the new setting is to a less sensitive position than the current active setting, set the time to next wipe to fifty seconds.
3) If the new setting is off, set the program state to idle.
4) If the new setting is wash, remember the program state, then set the program state to wash.
5) If the new setting is full time low or full time high speed, set the program state to manual.
6) If the new setting is an intermittent setting and the active setting is off, set the program state to cold start.
7) If the active setting is an intermittent setting and the new setting is less sensitive intermittent setting and the program state is low speed, set the program state to intermittent wipe.
8) If the active setting is manual low or high and the new setting is an intermittent setting, set the program state to intermittent wipe.
9) If the active setting is an intermittent setting and the new setting is a less sensitive intermittent setting and the program state is high speed, set the program state to low speed and request low speed wiping of the motor.

After performing the selected actions, the active stalk position is set equal to the new stalk position.

There are some actions that the wiper motor will initiate that are independent of the sensor 100. These actions are:

1) Stalk is moved from off to an intermittent setting, a wipe is initiated by the motor controller.
2) Stalk is moved to a more sensitive setting, a wipe is initiated by the motor controller.
3) Stalk is moved to full time low speed or full time high speed, the motor controller takes over.
4) Wash switch is activated on the stalk, the motor controller activates the washer pump and operates the wiper.

In all the above cases, the wiper motor controller informs the sensor 100 of the stalk position.

Generating Corrected Rain/Fog

This set of computations acts on the raw (16 samples summed) data and adjusts the data for LED 110 intensity variations, temperature, electronic offsets and uncertainties and ambient light effects.

The corrected data (rain or fog) is determined by the following:

$$I_c = \frac{T(I_u + OS + BOS_n)(1 - F_{LL})}{I_{ref}}$$

where, $I_c$ is the corrected signal, rain or fog.

$I_u$ is the uncorrected signal, rain or fog.

T is the "target", a multiplier to normalize the rain and fog signals so that the corrected rain and corrected fog exhibit the same percentage change when measuring a typical rain/fog situation. T is different for rain and fog and are stored in EEPROM at calibration time.

OS is the offset, equivalent to the electrical and optical intercept when no reflected light is seen. Is determined indirectly be varying the LED 110 intensity and extrapolating back to zero at calibration time. This value is stored in EEPROM.

$BOS_n$ is the electrical offset for a given background offset step that is injected into the circuitry to effectively extend the dynamic range of the system. The BOS value of a given step (n) is electrically measured and stored in EEPROM at calibration time. There are 16 different injection values that can be selected under software control.

$F_{LL}$ is the correction function that is applied to the system to correct for imperfections in the transfer function of the main photodiode 120. $F_{LL}$ is further broken down into $F_1 = m_0[L - L_0]$ when $L <= L_b$ $F_1 = m_0[L_b - L_0] + m_1[L - L_b]$ when $L > L_b$ where $m_0$, $m_1$ are two slopes that are determined at calibration time that best represent the data at two different points over the full ambient lighting conditions.

L is the ambient light at any given time.

$L_0$ is the light reading when sensor 100 is in darkness.

$L_b$ is the light level at the point where the two line segments, as represented, by the two slopes, intersect. This value is determined at calibration time.

$I_{ref}$ is the signal from the reference photodiode that is used to normalize the LED 110 intensity.

In addition to the corrected rain/fog value, the program provides an averaged corrected rain value that is the average of three successive rain/fog readings. This filter is a first in, first out moving boxcar average.

Intermittent Operation

This section describes how the sensor works when the stalk is in an intermittent setting.

Cold Start

When the ignition switch of the car is moved to the run or accessory position, both the wiper motor controller and the sensor 100 are powered up. If the stalk is in an intermittent setting, the motor controller waits two seconds and does a single wipe independent of the sensor 100.

During this two second stabilization period, the sensor 100 is sending the off request command, becoming thermally equilibrated, finding correct background offsets, and establishing average values to represent the level of background reflectance of the windshield.

After the initial wipe, the sensor 100 measures the level of reflection of the windshield 117 again, and the difference is assumed to be proportional to the amount of rain or moisture removed from the windshield 117. If this differential amount exceeds a threshold for the current stalk setting, the sensor 100 continues in intermittent mode, described below. If the amount removed does not exceed this threshold, the sensor 100 continues in a mode of lessened sensitivity, called watching mode.

In the case where the stalk is in an intermittent setting and rain conditions are not calling for wiping at regular intervals, the sensor 100 continues to monitor the level of reflection on the windshield 117. If this level exceeds the threshold for the selected stalk position, one wipe is performed and the same procedure that is detailed in the cold start mode is followed.

If the threshold is not exceeded and wiping is not required, the sensor assumes the current level of reflectance as a new baseline against which comparisons are made every sixty seconds. This adaptation compensates for inherent drift in the readings obtained by the sensor 100.

If the stalk if moved to a more sensitive position during this watching mode, the motor controller initiates a wipe, and the reflectance comparison repeated. If the stalk is moved to a less sensitive setting, the active threshold is updated to reflect the new stalk setting and no wipe is performed.

If the level if reflection of the windshield 117 appears to decrease in a slow manner, the base line is adjusted to track this change as this slow rate of change is assumed to be sensor 100 drift.

If the level of reflectance appears to increase very sharply, it is assumed that fog is forming on the inside of the windshield 117, and the level of reflectance of the windshield 117 is ignored for either ten or thirty seconds. The value of ten seconds is used if the signal as measured by the rain channel increases rapidly, where the thirty second interval is used there is a positive shift of the rain channel with a corresponding negative shift in the fog channel.

It is possible that sensor drift, fog on the glass 117 or outside influences will cause the sensor's output to change in a direction that will be interpreted as rain on the windshield 117, causing a "phantom" wipe, i.e., a wipe that was in error. A phantom wipe can be identified by the system when, after the wipe has occurred, the reflectance differential between before and after the wipe is beneath a specified value.

To reduce the number of phantoms that the system will cause, several techniques are used. If a wipe was performed and determined to be unnecessary, the wiping threshold is increased by the amount "rain" that the system thought was present just before the wipe. In this manner, the amount of rain, either real or interference, required to initiate another wipe is increased, decreasing the possibility of another phantom. The artificial elevation of the threshold is slowly decreased by one count every minute until the threshold is again at its default value as indicated by the stalk setting. Furthermore, there is a block against any additional wipes due to the rain channel for a period of thirty seconds. AFt the end of this time-out period, wiping can be initiated by the rain channel, as long as the threshold conditions are met.

The presence of fog on the inside surface of the glass 117 can introduce a large number of phantoms as it can appear as a highly reflective surface. The fog is corrected for by using the data from the fog channel in conjunction with the data from the rain channel and observing characteristics in both. The change in the rain channel that is due to fog can be characterized by a very large amount of reflected energy (signal) that contains a relatively low amount of high frequency changes. Higher frequency changes (changes that occur over a very short time interval) are attributed to genuine rain.

Signals that have a "smooth" characteristic are considered fog and are subtracted out on a continual basis.

Ambient light affects (above those that are corrected for by the corrected rain/fog calculation) are corrected for by increasing the threshold as a function of the measured ambient light. The presence of high levels of ambient light magnify noise and rain contribution to the signal, requiring a less sensitive threshold for a given condition.

Intermittent mode

When the amount of "rain" removed between wipes exceeds the threshold (as set by the stalk setting), the system goes into intermittent wiping mode.

In this mode wipes can occur if the instantaneous level of reflectance of the windshield 117 exceeds the threshold for the stalk setting (as in the watch mode) or the expected time delay between wipes is exceeded.

The expected time delay is a feedback mode of wiping, by which the sensor arrives a wipe rate which gives a level of reflecting with which the driver is comfortable. This method provides a level of consistency as perceived by the operator, independent of the actual short term rain conditions.

In this mode of wiping the level of reflection after the wipe is subtracted from the level of reflection before the wipe. If the difference exceeds the threshold selected by the stalk setting, the nominal delay between wipes is decreased. If the difference is less, the nominal delay between wipes is increased.

The phantom rejection methods discussed earlier are in effect during this mode as well.

In addition, if, after each wipe, the clean windshield 117 level appears to be increasing, fog is assumed to be present and the threshold is increased.

If, at any time during this mode, a delay between wipes of greater than one minute is reached, the sensor 100 reverts to the watching mode of operation.

Constant low/high Speed Wiping

If three out of the last eight wipes occur with a time between wipes of less than 1.5 seconds and the level of reflection on the windshield 117 exceeds the amount indicated by the stalk for low speed wiping, the sensor 100 requests the motor to wipe constantly in low speed.

Once in low (or high) speed, the criteria for wiping rate is changed. Instead of looking at a level of "rain" on the glass, the signal is analyzed in terms of movement of the signal. The data from the rain and fog channels is analyzed and a standard deviation (sigma) for five successive points is calculated. (The deviations are defined as perturbations around a straight line drawn through the data. The line is computed in order to remove the rate of change effects in the data as would be introduced by the presence of fog.) The resulting sigma is averaged over three successive groups of data and the average is then used as the criteria for wiping in low or high speed.

If five out of eight wipes' sigma do not exceed the threshold for low speed wiping, the sensor 100 reverts to intermittent mode.

If four of eight wipes' sigma exceed the threshold for passing from low speed wiping to high speed wiping, the sensor 100 requests the motor to wipe at high speed.

If seven of eight wipes' sigma fall below the threshold for high speed wiping, the sensor 100 reverts to low speed wiping.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for detecting the presence of water droplets on a windshield of a vehicle, comprising:

a first sensor channel, comprising:
a first light source for illuminating a first portion of the windshield with first light rays; and
a first light sensor for detecting, and for producing a first output proportional to, at least a portion of the first light rays scattered by the water droplets on the windshield, wherein first light rays directly reflected by the windshield do not impinge upon the first light sensor;

a second sensor channel, comprising:
- a second light source for illuminating a second portion of the windshield with second light rays; and
- a second light sensor for detecting, and for producing a second output proportional to, at least a portion of the second light rays directly reflected by the windshield and at least a portion of the second light rays scattered by the water droplets on the windshield; and a processor having inputs coupled to the first and second outputs, the processor producing a control signal indicative of whether the amount of water droplets on the windshield exceeds a predetermined threshold.

2. The apparatus of claim 1, wherein the first and second light sensors comprise a single light sensor operated with time division multiplexing.

3. The apparatus of claim 1, wherein the first and second light sources comprise infrared LEDs.

4. The apparatus of claim 1, further comprising:
- a temperature sensor operative to sense a temperature of the first and second light sources; and
- a drive circuit coupled to the temperature sensor and to the first and second light sources, wherein the drive circuit supplies a drive current to the first and second light sources and the drive current is reduced as the temperature of the first and second light sources increases.

5. The apparatus of claim 1, wherein no portion of the apparatus contacts the windshield.

6. The apparatus of claim 1, wherein the water droplets comprise rain on an exterior of the windshield and condensed water vapor fog on an interior of the windshield.

7. A method for detecting the presence of water droplets on a windshield of a vehicle, comprising the steps of:
   a) illuminating a first portion of the windshield with first light rays;
   b) sensing at least a portion of the first light rays scattered by the water droplets on the windshield;
   c) illuminating a second portion of the windshield with second light rays;
   d) sensing at least a portion of the second light rays directly reflected by the windshield and at least a portion of the second light rays scattered by the water droplets on the windshield; and
   e) producing a control signal indicative of whether the amount of water droplets on the windshield exceeds a predetermined threshold based upon the sensed light of steps (b) and (d).

8. An apparatus for detecting the presence of water droplets on the windshield of a vehicle, comprising:
   a first sensor channel operative to detect rain on an exterior of the windshield and produce a first output, the first sensor channel comprising:
   - a first light source for illuminating a first portion of the windshield with first light rays; and
   - a first light sensor for detecting, and for producing a first output proportional to, at least a portion of the first light rays scattered by the rain on the windshield, wherein first light rays directly reflected by the windshield do not impinge upon the first light sensor; and a second sensor channel operative to detect condensed water vapor fog on an interior of the windshield and produce a second output, the second sensor channel comprising:
   - a second light source for illuminating a second portion of the windshield with second light rays; and
   - a second light sensor for detecting, and for producing a second output proportional to, at least a portion of the second light rays directly reflected by the windshield and at least a portion of the second light rays scattered by the fog on the windshield; and a processor having inputs coupled to the first and second outputs, the processor operable to use the second output to correct the first output such that contributions to the first output caused by fog are substantially removed, wherein the processor is further operable to produce a control signal using the corrected first output, wherein the control signal is indicative of whether the amount of rain on the exterior of the windshield exceeds a predetermined threshold.

9. The apparatus of claim 8, wherein the first and second light sensors comprise a single light sensor operated with time division multiplexing.

10. The apparatus of claim 8, wherein the first and second light sources comprise infrared LEDs.

11. The apparatus of claim 8, further comprising:
- a temperature sensor operative to sense a temperature of the first and second light sources; and
- a drive circuit coupled to the temperature sensor and to the first and second light sources, wherein the drive circuit supplies a drive current to the first and second light sources and the drive current is reduced as the temperature of the first and second light sources increases.

12. The apparatus in claim 8, wherein no portion of the apparatus contacts the windshield.

13. An apparatus for detecting the presence of water droplets on the windshield of a vehicle, comprising:
   at least one sensor operative to produce an output signal proportional to the amount of water droplets on the windshield, wherein no portion of the at least one sensor contacts the windshield, the at least one sensor comprising:
   - a first light source for illuminating a first portion of the windshield with first light rays; and
   - a first light sensor for detecting, and for producing a first output proportional to, at least a portion of the first light rays scattered by the water droplets on the windshield, wherein first light rays directly reflected by the windshield do not impinge upon the first light sensor; a second sensor channel, comprising:
     - a second light source for illuminating a second potion of the windshield with second light rays; and
     - a second light sensor for detecting, and for producing a second output proportional to, at least a portion of the second light rays directly reflected by the windshield and at least a portion of the second light rays scattered by the water droplets on the windshield; and
   - a processor having inputs coupled to the first and second outputs, the processor producing a control signal indicative of whether the amount of water droplets on the windshield exceeds a predetermined threshold.

14. The apparatus of claim 13, wherein the first and second light sensors comprise a single light sensor operated with time division multiplexing.

15. The apparatus of claim 13, wherein the first and second light sources comprise infrared LEDs.

16. The apparatus of claim 13, further comprising:
- a temperature sensor operative to sense a temperature of the first and second light sources; and a drive circuit coupled to the temperature sensor and to the first and second light sources, wherein the drive circuit supplies a drive current to the first and second light sources and the drive current is reduced as the temperature of the first and second light sources increases.

17. The apparatus of claim 13, wherein the water droplets comprise rain on an exterior of the windshield and condensed water vapor fog on an interior of the windshield.

18. The apparatus of claim 13, wherein the at least one sensor comprises:
 a first sensor channel operative to detect rain on an exterior of the windshield and produce a first output;
 a second sensor channel operative to detect condensed water vapor fog on an interior of the windshield and produce a second output; and
 a processor having inputs coupled to the first and second outputs, the processor operable to use the second output to correct the first output such that contributions to the first output caused by fog are substantially removed, wherein the processor is further operable to produce a control signal using the corrected first output, wherein the control signal is indicative of whether the amount of rain on the exterior of the windshield exceeds a predetermined threshold.

19. The apparatus of claim 18, wherein:
 the first sensor channel comprises:
  a first light source for illuminating a first portion of the windshield with first light rays; and
  a first light sensor for detecting, and for producing a first output proportional to, at least a portion of the first light rays scattered by the rain on the windshield, wherein first light rays directly reflected by the windshield do not impinge upon the first light sensor; and
 the second sensor channel comprises:
  a second light source for illuminating a second portion of the windshield with second light rays; and
  a second light sensor for detecting, and for producing a second output proportional to, at least a portion of the second light rays directly reflected by the windshield and at least a portion of the second light rays scattered by the fog on the windshield.

20. The apparatus of claim 19, wherein the first and second light sensors comprise a single light sensor operated with time division multiplexing.

21. The apparatus of claim 19, wherein the first and second light sources comprise infrared LEDs.

22. The apparatus of claim 19, further comprising:
 a temperature sensor operative to sense a temperature of the first and second light sources; and
 a drive circuit coupled to the temperature sensor and to the first and second light sources, wherein the drive circuit supplies a drive current to the first and second light sources and the drive current is reduced as the temperature of the first and second light sources increases.

* * * * *

UNITED STATES PATENT AND TRADEMARK OFFICE
CERTIFICATE OF CORRECTION

PATENT NO. : 6,084,519
DATED : July 4, 2000
INVENTOR(S) : Coulling et al.

Page 1 of 2

It is certified that error appears in the above-identified patent and that said Letters Patent is hereby corrected as shown below:

Column 2,
Line 45, please change "additionally" to -- additional --.

Column 4,
Line 3, please change "vent" to -- event --.

Column 5,
Line 33, please change "ay" to -- any --.
Line 67, please change "his" to -- is --.

Column 11,
Line 35, please change "time" to -- times --.
Line 48, please delete "an upper", second occurrence.
Line 64, please change "tipper" to -- upper --.

Column 16,
Line 15, please change "than" to -- then --.

Column 17,
Line 61, please change "flass" to -- glass --.

Column 18,
Line 66, please change "lamp" to -- amp --.

Column 19,
Line 34, please change "temp light level" to -- temp-light-level --.
Line 47, please change "uncollected" to -- uncorrected --.

Column 22,
Line 60, please insert -- Watching Mode --.

Column 23,
Line 10, please change "if" to -- of --.

UNITED STATES PATENT AND TRADEMARK OFFICE
CERTIFICATE OF CORRECTION

PATENT NO. : 6,084,519
DATED : July 4, 2000
INVENTOR(S) : Coulling et al.

It is certified that error appears in the above-identified patent and that said Letters Patent is hereby corrected as shown below:

<u>Column 26,</u>
Line 28, please change "in" to -- of --.
Line 47, please change "potion" to -- portion --.

Signed and Sealed this

Fourth Day of December, 2001

Attest:

*Attesting Officer*

NICHOLAS P. GODICI
*Acting Director of the United States Patent and Trademark Office*